(12) United States Patent
Scoley et al.

(10) Patent No.: US 10,919,631 B2
(45) Date of Patent: *Feb. 16, 2021

(54) AIRCRAFT WITH MULTIPLE DOORS AND MULTIPLE ZONES

(71) Applicant: SAFRAN CABIN INC., Huntington Beach, CA (US)

(72) Inventors: Ian Geoffrey Scoley, Huntington Beach, CA (US); Christopher Schuttera, Huntington Beach, CA (US); Scott Savian, Huntington Beach, CA (US); Eric Heimbach, Huntington Beach, CA (US)

(73) Assignee: SAFRAN CABIN INC., Huntington Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/588,515

(22) Filed: Sep. 30, 2019

(65) Prior Publication Data

US 2020/0130837 A1    Apr. 30, 2020

Related U.S. Application Data

(63) Continuation-in-part of application No. 16/566,652, filed on Sep. 10, 2019, now Pat. No. 10,661,879, (Continued)

(51) Int. Cl.
*B64D 11/00* (2006.01)
*B64C 1/14* (2006.01)
(Continued)

(52) U.S. Cl.
CPC .............. *B64D 11/00* (2013.01); *B64C 1/143* (2013.01); *B64C 1/1415* (2013.01);
(Continued)

(58) Field of Classification Search
CPC ..... B64C 1/1415; B64C 1/1423; B64C 1/143; B64C 29/0016; B64D 11/00;
(Continued)

(56) References Cited

U.S. PATENT DOCUMENTS 2,268,927 A * 1/1942 Demme .......................... 211/45
2,572,442 A * 10/1951 Burnelli .................. B64C 39/00
244/118.5
(Continued)

FOREIGN PATENT DOCUMENTS

WO    2017/093871 A1    6/2017
WO    2018178246 A1    10/2018

OTHER PUBLICATIONS

International Search Report and Written Opinion issued in PCT/US19/58488.
(Continued)

*Primary Examiner* — Medhat Badawi
(74) *Attorney, Agent, or Firm* — Jeffer Mangels Butler & Mitchell LLP; Brennan C. Swain, Esq.

(57) ABSTRACT

An aircraft that includes a body that defines a cabin interior, front and back rows of seats positioned in the passenger zone, a forward door that is pivotable between a closed position and an open position, and an aft door that is pivotable between a closed position and an open position. The cabin interior includes a pilot zone, a passenger zone positioned aft of the pilot zone, and a cargo zone positioned aft of the passenger zone. The pilot zone and the front row of seats are accessible and the back row and cargo zone are inaccessible from an exterior of the body when the aft door is in the closed position and the forward door is in the open position. The back row and cargo zone are accessible and the pilot zone and the front row of seats are inaccessible from
(Continued)

the exterior of the body when the aft door is in the open position and the forward door is in the closed position.

17 Claims, 17 Drawing Sheets

Related U.S. Application Data which is a continuation of application No. PCT/US2019/049022, filed on Aug. 30, 2019.

(60) Provisional application No. 62/751,870, filed on Oct. 29, 2018, provisional application No. 62/751,895, filed on Oct. 29, 2018, provisional application No. 62/751,884, filed on Oct. 29, 2018.

(51) Int. Cl.
*B64C 29/00* (2006.01)
*B64D 11/06* (2006.01)

(52) U.S. Cl.
CPC ...... *B64C 29/0016* (2013.01); *B64D 11/0601* (2014.12); *B64D 11/0636* (2014.12); *B64D 11/0638* (2014.12); *B64D 11/062* (2014.12); *B64D 11/0689* (2013.01)

(58) Field of Classification Search
CPC .............. B64D 11/0601; B64D 11/062; B64D 11/0627; B64D 11/0636; B64D 11/0638; B64D 11/0689; B64D 11/06; B64D 11/0023
See application file for complete search history.

(56) References Cited

U.S. PATENT DOCUMENTS

| | | | | |
|---|---|---|---|---|
| 2,598,814 | A * | 6/1952 | McAfee | E05F 17/004 312/275 |
| 2,710,731 | A * | 6/1955 | Bright | B64D 11/0023 244/118.6 |
| 3,119,441 | A * | 1/1964 | Furry, Jr. | B64C 1/1407 160/212 |
| 3,148,848 | A * | 9/1964 | Price | B64C 29/0066 244/23 D |
| 3,423,121 | A * | 1/1969 | Lipkin | B60R 21/06 296/24.4 |
| 3,703,310 | A * | 11/1972 | Lystad | B60N 2/3065 296/10 |
| 4,088,322 | A * | 5/1978 | Nikoden, Jr. | F41J 7/00 273/406 |
| 4,102,381 | A * | 7/1978 | Bratschi | E06B 9/36 160/168.1 R |
| 4,165,846 | A * | 8/1979 | Groeger | B60B 3/048 244/2 |
| 4,180,943 | A * | 1/1980 | Smith | B64C 1/1407 244/129.5 |
| 4,597,549 | A * | 7/1986 | Ryan | B64C 1/10 160/127 |
| 4,861,103 | A * | 8/1989 | Vallee | B64D 25/04 297/216.2 |
| 4,899,962 | A * | 2/1990 | Mueller | B64D 25/00 160/354 |
| 5,133,587 | A * | 7/1992 | Hadden, Jr. | B60N 2/4214 297/146 |
| 5,165,626 | A * | 11/1992 | Ringger | B64D 11/0023 16/282 |
| 5,277,381 | A * | 1/1994 | Piasecki | B64C 27/82 244/17.19 |
| 5,306,066 | A * | 4/1994 | Saathoff | B60J 5/0451 188/377 |
| 5,320,308 | A * | 6/1994 | Bilezikjian | B64D 11/064 244/122 R |
| 5,338,090 | A * | 8/1994 | Simpson | B60N 2/4221 297/216.2 |
| 5,340,059 | A * | 8/1994 | Kanigowski | B64D 25/00 244/118.5 |
| 5,344,210 | A * | 9/1994 | Marwan | B64D 25/04 297/216.2 |
| 5,350,144 | A * | 9/1994 | Lary | A45D 20/12 248/183.1 |
| 5,393,013 | A * | 2/1995 | Schneider | B64D 11/0023 160/351 |
| 5,445,861 | A * | 8/1995 | Newton | B32B 3/12 428/116 |
| 5,482,230 | A * | 1/1996 | Bird | B64C 1/10 244/118.5 |
| 5,531,499 | A * | 7/1996 | Vecchio | B60R 13/0206 188/377 |
| 5,573,304 | A * | 11/1996 | Glockl | A47C 3/023 248/626 |
| 5,577,358 | A * | 11/1996 | Franke | B64D 11/0023 244/118.5 |
| 5,649,721 | A * | 7/1997 | Stafford | B60R 21/04 244/118.5 |
| 5,716,026 | A * | 2/1998 | Pascasio | B64D 11/00 105/315 |
| 5,788,185 | A * | 8/1998 | Hooper | B64D 11/0619 244/118.6 |
| 5,816,534 | A * | 10/1998 | Schumacher | B64D 11/0023 244/119 |
| 5,836,547 | A * | 11/1998 | Koch | B64D 11/0649 244/122 R |
| 5,839,757 | A * | 11/1998 | von Lange | B60R 21/06 280/749 |
| 5,876,064 | A * | 3/1999 | Ament | B60R 21/06 280/749 |
| 6,120,071 | A * | 9/2000 | Picard | E05B 65/1046 292/165 |
| 6,138,412 | A * | 10/2000 | Rieckmann | E05F 15/53 49/340 |
| 6,158,771 | A * | 12/2000 | Nusser | B60R 13/0225 280/752 |
| 6,234,526 | B1 * | 5/2001 | Song | B60R 21/04 280/751 |
| 6,245,408 | B1 * | 6/2001 | Bitzer | F16F 7/121 428/118 |
| 6,264,238 | B1 * | 7/2001 | MacDonald | B60R 21/04 280/751 |
| 6,340,171 | B1 * | 1/2002 | Hirth | B60R 21/213 280/730.2 |
| 6,382,562 | B1 * | 5/2002 | Whitlock | B64C 1/22 244/118.3 |
| 6,523,779 | B1 * | 2/2003 | Michel | B64D 11/0023 244/118.5 |
| 6,588,705 | B1 * | 7/2003 | Frank | B64C 1/1469 244/118.5 |
| 6,616,100 | B2 * | 9/2003 | Sankrithi | B64C 1/1415 244/118.3 |
| 6,659,537 | B2 * | 12/2003 | Moriyama | B60J 5/0412 296/146.12 |
| 6,672,662 | B1 * | 1/2004 | Balk | B60N 2/3013 297/238 |
| 6,692,069 | B2 * | 2/2004 | Beroth | B64D 11/0644 297/118 |
| 6,698,819 | B1 * | 3/2004 | Mozer | B60R 21/04 180/90 |
| 6,758,507 | B2 * | 7/2004 | Tarahomi | B29D 99/0089 293/109 |
| 6,780,488 | B2 * | 8/2004 | Holemans | B29C 70/086 156/242 |
| 6,808,206 | B2 * | 10/2004 | Yata | B60R 21/04 280/751 |
| 7,000,976 | B2 * | 2/2006 | Azzouz | B60J 5/0479 296/146.1 |
| 7,083,146 | B2 * | 8/2006 | Hiesener | B64D 11/064 244/118.6 |
| 7,213,882 | B2 * | 5/2007 | Dryburgh | A47C 1/0352 297/354.13 |

(56) References Cited

U.S. PATENT DOCUMENTS

| | | | | |
|---|---|---|---|---|
| 7,287,796 B2* | 10/2007 | Coles | B60R 5/044 | |
| | | | 160/370.23 | |
| 7,296,608 B2* | 11/2007 | Weishar | E05D 15/54 | |
| | | | 160/200 | |
| 7,347,399 B2* | 3/2008 | Bouchet | B64C 1/10 | |
| | | | 244/121 | |
| 7,469,861 B2 | 12/2008 | Ferry | | |
| 7,896,291 B2* | 3/2011 | Dehn | B64D 11/00 | |
| | | | 244/129.5 | |
| 7,905,451 B2* | 3/2011 | Schotte | B64D 11/0696 | |
| | | | 244/118.6 | |
| 7,975,963 B2* | 7/2011 | Merz | B64D 9/00 | |
| | | | 244/121 | |
| 8,091,939 B2* | 1/2012 | Forsyth | B60R 21/12 | |
| | | | 296/24.4 | |
| 8,152,096 B2* | 4/2012 | Smith | B64C 29/0033 | |
| | | | 244/60 | |
| 8,317,135 B2* | 11/2012 | Carter | B64C 1/143 | |
| | | | 244/129.5 | |
| 8,371,638 B2* | 2/2013 | Heidrich | B61D 19/02 | |
| | | | 296/146.13 | |
| 8,474,757 B2 | 7/2013 | Harcup | | |
| 8,590,838 B2* | 11/2013 | Cook | B64C 1/10 | |
| | | | 244/118.6 | |
| 8,800,912 B2* | 8/2014 | Oliver | B64C 39/08 | |
| | | | 244/12.4 | |
| 8,833,699 B2* | 9/2014 | Hanson | E05B 65/0894 | |
| | | | 244/129.4 | |
| 8,864,071 B2* | 10/2014 | Vergnaud | B60N 2/34 | |
| | | | 244/118.6 | |
| 8,905,014 B2* | 12/2014 | Shaffer | F24C 15/026 | |
| | | | 126/190 | |
| 8,960,602 B2* | 2/2015 | Neumann | B64D 11/0023 | |
| | | | 244/118.5 | |
| 9,126,689 B2 | 9/2015 | Porter | | |
| 9,199,740 B2* | 12/2015 | Ehlers | B64D 11/06 | |
| 9,266,613 B2* | 2/2016 | Henshaw | B64D 11/0643 | |
| 9,327,836 B2* | 5/2016 | Weitzel | B64D 11/003 | |
| 9,382,007 B2* | 7/2016 | Ersan | B64D 11/0641 | |
| 9,428,132 B2* | 8/2016 | Obadia | B64D 11/00 | |
| 9,476,246 B2 | 10/2016 | Fairchild | | |
| 9,511,867 B2* | 12/2016 | Schliwa | B64D 11/0691 | |
| 9,650,146 B2* | 5/2017 | Boenning | B60N 2/3002 | |
| 9,718,550 B2* | 8/2017 | Ko | B64D 11/0601 | |
| 9,718,552 B2* | 8/2017 | Zheng | B64D 11/0619 | |
| 9,868,528 B2* | 1/2018 | Mayer | B64D 11/0023 | |
| 10,011,058 B2* | 7/2018 | Sutton | B60N 2/80 | |
| 10,040,534 B2* | 8/2018 | Kooiman | B64C 29/0033 | |
| 10,059,423 B2* | 8/2018 | Smithson | B32B 5/26 | |
| 10,106,187 B1* | 10/2018 | Farrar | B62B 7/12 | |
| 10,358,173 B2* | 7/2019 | Gussen | B60R 21/026 | |
| 2002/0070314 A1* | 6/2002 | Schmidt-Schaeffer | | |
| | | | B60N 2/34 | |
| | | | 244/118.6 | |
| 2003/0094837 A1* | 5/2003 | Williamson | B64D 11/064 | |
| | | | 297/163 | |
| 2005/0103934 A1* | 5/2005 | Smith, Jr. | B64C 1/00 | |
| | | | 244/118.1 | |
| 2006/0006704 A1* | 1/2006 | Skelly | B60N 2/643 | |
| | | | 297/188.08 | |
| 2007/0069073 A1* | 3/2007 | Ferry | B60N 2/309 | |
| | | | 244/118.6 | |
| 2007/0138780 A1* | 6/2007 | Beki | B60R 21/13 | |
| | | | 280/756 | |
| 2007/0222266 A1* | 9/2007 | Lucci | A47C 3/045 | |
| | | | 297/331 | |
| 2009/0078824 A1* | 3/2009 | Osborne | E05D 15/56 | |
| | | | 244/119 | |
| 2009/0145031 A1* | 6/2009 | Collene | E05F 17/004 | |
| | | | 49/113 | |
| 2009/0146004 A1* | 6/2009 | Plant | B64D 11/06 | |
| | | | 244/118.5 | |
| 2009/0200422 A1* | 8/2009 | Johnson | B64D 11/0023 | |
| | | | 244/118.5 | |
| 2009/0242149 A1* | 10/2009 | Breuer | B60P 3/36 | |
| | | | 160/368.1 | |
| 2010/0038485 A1* | 2/2010 | Harcup | B64D 11/06 | |
| | | | 244/118.6 | |
| 2010/0051753 A1* | 3/2010 | Yoeli | B64C 29/0025 | |
| | | | 244/23 A | |
| 2010/0078985 A1* | 4/2010 | Mahoney | B32B 3/12 | |
| | | | 297/446.1 | |
| 2010/0252680 A1* | 10/2010 | Porter | B64D 11/00151 | |
| | | | 244/118.6 | |
| 2010/0255919 A1* | 10/2010 | Kelly | A47D 13/105 | |
| | | | 472/118 | |
| 2010/0308164 A1* | 12/2010 | McKeever | B64D 11/0606 | |
| | | | 244/118.6 | |
| 2010/0310314 A1* | 12/2010 | Juel | E02B 7/205 | |
| | | | 405/94 | |
| 2011/0030166 A1* | 2/2011 | Brown | E05F 15/53 | |
| | | | 16/71 | |
| 2011/0062283 A1* | 3/2011 | Breuer | B64D 11/00 | |
| | | | 244/118.5 | |
| 2011/0084172 A1* | 4/2011 | Fairchild | B64D 11/0007 | |
| | | | 244/137.1 | |
| 2012/0223186 A1* | 9/2012 | Henshaw | B64D 11/00151 | |
| | | | 244/118.6 | |
| 2012/0248246 A1* | 10/2012 | Savian | B64D 11/06 | |
| | | | 244/118.6 | |
| 2012/0292967 A1* | 11/2012 | Cailleteau | A47C 7/445 | |
| | | | 297/311 | |
| 2013/0008997 A1* | 1/2013 | Gentile | B64C 37/00 | |
| | | | 244/2 | |
| 2013/0076081 A1* | 3/2013 | Curto | A47C 4/52 | |
| | | | 297/148 | |
| 2013/0106156 A1* | 5/2013 | Orson | B64D 11/064 | |
| | | | 297/217.3 | |
| 2013/0248651 A1* | 9/2013 | Burrows | B64D 11/003 | |
| | | | 244/118.5 | |
| 2014/0014774 A1* | 1/2014 | Pozzi | B64D 11/0015 | |
| | | | 244/118.6 | |
| 2014/0020298 A1* | 1/2014 | Kowalczyk | E05F 15/603 | |
| | | | 49/118 | |
| 2014/0124623 A1* | 5/2014 | Chandler | B64D 11/0023 | |
| | | | 244/118.5 | |
| 2014/0124624 A1* | 5/2014 | Jacobsen | B64D 11/0023 | |
| | | | 244/118.5 | |
| 2014/0138986 A1* | 5/2014 | Tsuneyama | B60R 21/34 | |
| | | | 296/187.09 | |
| 2014/0158826 A1* | 6/2014 | Young | B64D 11/02 | |
| | | | 244/118.5 | |
| 2014/0175219 A1* | 6/2014 | Young | B64D 11/02 | |
| | | | 244/118.5 | |
| 2014/0306500 A1* | 10/2014 | Dryburgh | B64D 11/0604 | |
| | | | 297/232 | |
| 2014/0319267 A1* | 10/2014 | Paranjape | B64C 3/42 | |
| | | | 244/47 | |
| 2014/0352109 A1* | 12/2014 | Chen | E05D 15/0621 | |
| | | | 16/90 | |
| 2014/0375090 A1* | 12/2014 | Wegenka | B60R 7/043 | |
| | | | 297/188.09 | |
| 2015/0035340 A1* | 2/2015 | Lussan | B64D 11/06 | |
| | | | 297/463.1 | |
| 2015/0152677 A1* | 6/2015 | Fairchild | E05F 15/652 | |
| | | | 49/109 | |
| 2015/0197976 A1* | 7/2015 | Talbot | F16H 21/44 | |
| | | | 74/89 | |
| 2015/0284084 A1* | 10/2015 | Mayer | B64D 11/0023 | |
| | | | 244/118.5 | |
| 2015/0284085 A1* | 10/2015 | McKee | B64D 11/02 | |
| | | | 244/118.5 | |
| 2015/0287564 A1* | 10/2015 | Benke | F16C 1/10 | |
| | | | 337/5 | |
| 2015/0336674 A1* | 11/2015 | Foucher | B64D 11/0606 | |
| | | | 244/118.6 | |
| 2016/0001735 A1* | 1/2016 | Quatanens | B64D 11/06205 | |
| | | | 244/121 | |

(56) References Cited

U.S. PATENT DOCUMENTS

| | | | |
|---|---|---|---|
| 2016/0083094 A1* | 3/2016 | Clucas | B64D 11/0601 244/118.6 |
| 2016/0096627 A1* | 4/2016 | Gehret | B64D 11/06205 244/121 |
| 2016/0194068 A1* | 7/2016 | Savian | B64C 1/1469 160/213 |
| 2016/0198864 A1* | 7/2016 | Yang | A47D 15/00 5/655 |
| 2016/0214702 A1* | 7/2016 | Stucki | B64C 1/143 |
| 2016/0296419 A1* | 10/2016 | Paulussen | A61H 31/006 |
| 2016/0297525 A1* | 10/2016 | Walton | B64D 11/0023 |
| 2016/0304204 A1* | 10/2016 | McKee | B64D 11/0602 |
| 2016/0332734 A1* | 11/2016 | Goode | B64D 11/0638 |
| 2017/0021929 A1* | 1/2017 | McKee | B64D 11/0691 |
| 2017/0021933 A1* | 1/2017 | Pozzi | B64D 11/0631 |
| 2017/0036765 A1* | 2/2017 | Braca | B64D 11/0606 |
| 2017/0129608 A1* | 5/2017 | Reams | B64D 11/0624 |
| 2017/0129611 A1* | 5/2017 | Morgan | B64D 11/0601 |
| 2017/0267350 A1* | 9/2017 | Heidtmann | B60R 21/026 |
| 2017/0267353 A1* | 9/2017 | McIntosh | B64D 11/04 |
| 2017/0283060 A1* | 10/2017 | Papke | B64D 11/0023 |
| 2017/0283061 A1* | 10/2017 | Papke | B64D 11/0023 |
| 2017/0283065 A1* | 10/2017 | Papke | G09F 19/22 |
| 2017/0297719 A1* | 10/2017 | Lorsignol | B64D 11/0601 |
| 2018/0022457 A1* | 1/2018 | Papke | B64D 11/0023 244/118.6 |
| 2018/0194471 A1* | 7/2018 | Merrick | B64D 11/0023 |
| 2018/0222589 A1* | 8/2018 | Papke | B64D 11/0627 |
| 2018/0273168 A1* | 9/2018 | Page | B64C 27/24 |
| 2018/0280281 A1 | 10/2018 | Carlioz | |
| 2019/0255923 A1* | 8/2019 | Salles | B60Q 1/323 |
| 2020/0130805 A1* | 4/2020 | Heimbach | B64D 11/06 |
| 2020/0130837 A1* | 4/2020 | Scoley | B64C 1/1415 |
| 2020/0130845 A1* | 4/2020 | Heimbach | B64D 11/0601 |
| 2020/0140090 A1* | 5/2020 | Scoley | B64D 11/0636 |

OTHER PUBLICATIONS

NASA Contractor Report entitled Application of Advanced Technologies to Derivatives of Current Small Transport Aircraft (Renze et al.) Jul. 1981 (Jul. 1981).

International Search Report and Written Opinion issued in PCT/US19/49034.

International Search Report and Written Opinion issued in PCT/US19/58481.

https://www.simflight.com/2011/04/16/review-carenado-b58-baron-fsx-using-arezone-sound-pack/ ("Simflight") dated Apr. 16, 2011.

International Search Report and Written Opinion issued in PCT/US19/49031.

International Search Report and Written Opinion issued in PCT/US19/49022.

* cited by examiner ately same. In

AIRCRAFT WITH MULTIPLE DOORS AND MULTIPLE ZONES

CROSS REFERENCE TO RELATED APPLICATIONS

This is a continuation-in-part of U.S. patent application Ser. No. 16/566,652, filed Sep. 10, 2019, which is a continuation of International Application PCT/US19/49022, with an international filing date of Aug. 30, 2019, which claims the benefit of U.S. Provisional Application Nos. 62/751,870, filed Oct. 29, 2018, 62/751,884, filed Oct. 29, 2018 and 62/751,895, filed Oct. 29, 2018, the entireties of which are incorporated herein by reference.

FIELD OF THE INVENTION

The present invention relates generally to an aircraft with multiple doors that open to allow access to multiple zones within the aircraft.

BACKGROUND OF THE INVENTION

With the rise in popularity in ride sharing, small aircraft that can accommodate a small number of passengers for relatively short (e.g., intra-city) trips are contemplated. In a small aircraft with a cargo area for luggage located directly behind the passengers, it is possible for the passengers in the closest row to be able to access the luggage. This can be an issue if multiple passengers' luggage are located in the cargo hold.

SUMMARY OF THE PREFERRED EMBODIMENTS

In accordance with a first aspect of the present invention there is provided an aircraft that includes a body that defines a cabin interior that includes a pilot zone, a passenger zone positioned aft of the pilot zone, and a cargo zone positioned aft of the passenger zone. The aircraft also includes front and back rows of seats positioned in the passenger zone, a forward door that is pivotable between a closed position and an open position, and an aft door that is pivotable between a closed position and an open position. The pilot zone and the front row of seats are accessible and the back row and cargo zone are inaccessible from an exterior of the body when the aft door is in the closed position and the forward door is in the open position, and the back row and cargo zone are accessible and the pilot zone and the front row of seats are inaccessible from the exterior of the body when the aft door is in the open position and the forward door is in the closed position.

In a preferred embodiment, the body includes a side opening. In the closed positions, the forward and aft doors are positioned in the side opening. The side opening includes a pilot zone access portion, a front row access portion, a back row access portion and a cargo zone access portion. In the closed position, the forward door blocks access to the pilot zone access portion and the front row access portion, and in the closed position, the aft door blocks access to the back row access portion and the cargo zone access portion. Preferably, in the open position the forward and aft doors define a protected area therebetween.

In accordance with another aspect of the present invention there is provided an aircraft that includes a body that defines a cabin interior and a longitudinal axis, a pilot seat positioned in the pilot zone and on a first side of the cabin interior, and front and back rows positioned in the passenger zone. The body is bifurcated by a central plane that divides the cabin interior into first and second sides and the cabin interior includes a pilot zone and a passenger zone positioned aft of the pilot zone. The front row includes a first front seat positioned on the first side of the cabin interior and a second front seat positioned on the second side of the cabin interior. At least a portion of the second front seat is positioned forwardly of the first front seat. The back row includes a first back seat positioned on the first side of the cabin interior and a second back seat positioned on the second side of the cabin interior.

In a preferred embodiment, the aircraft includes a first divider member that divides the cabin interior into the pilot zone and the passenger zone. The first divider member includes a first section positioned on the first side of the cabin interior, a second section positioned on the second side of the cabin interior, and a connector section extending between the first and second sections. At least a portion of the first section is positioned forwardly of the second section. Preferably, the second section and the connector section cooperate to define foot space forward of the second front seat.

In a preferred embodiment, the body includes a PRM door that is movable between an open and a closed position. The second section of the first divider member is positioned forward of the PRM door when it is in the closed position. This positioning of the second section provides a PRM pathway through the door and into the seat.

In a preferred embodiment, at least a portion of the second back seat is positioned forwardly of the first back seat. In this embodiment, the second divider member includes a first section positioned on the first side of the cabin interior, a second section positioned on the second side of the cabin interior, and a connector section extending between the first and second sections. At least a portion of the first section is positioned forwardly of the second section.

In a preferred embodiment, the second divider member is curved. Preferably, a first line tangent to the second divider member extends parallel to a back surface of the first back seat, and a second line tangent to the second divider member extends parallel to a back surface of the second back seat. This is made possible by the back seats being angled away from one another.

In a preferred embodiment, the pilot seat is angled inwardly such that it forms a fifth acute angle with the longitudinal axis. The pilot seat can also be angled outwardly or face straight ahead.

In accordance with another aspect of the present invention there is provided an aircraft that includes a body that defines a cabin interior and a longitudinal axis, and front and back rows positioned in the cabin interior. The front row includes a first front seat and a second front seat that face aft. The back row includes a first back seat and a second back seat that face forward.

In a preferred embodiment, the first and second front seats are angled toward one another. The first front seat is angled inwardly such that it forms a first acute angle with the longitudinal axis. The second front seat is angled inwardly such that it forms a second acute angle with the longitudinal axis, and the first and second acute angles are approximately the same. The first and second back seats are angled away from one another. The first back seat is angled outwardly such that it forms a third acute angle with the longitudinal axis. The second back seat is angled outwardly such that it forms a fourth acute angle with the longitudinal axis and the third and fourth acute angles are the approximately same. In another embodiment, the front seats can be angled outwardly and the back seats can be angled inwardly.

In a preferred embodiment, the first front seat is angled inwardly such that it forms a first acute angle with the longitudinal axis and the second front seat is oriented such that it is parallel with the longitudinal axis. The first back seat is angled outwardly such that it forms a second acute angle with the longitudinal axis and the second back seat is oriented such that it is parallel with the longitudinal axis. The first and second acute angles are the approximately same. At least a portion of the second front seat is positioned forwardly of the first front seat.

In accordance with another aspect of the present invention there is provided an aircraft that includes a body that defines a cabin interior, a divider member that divides the cabin interior into a cargo hold and a passenger cabin, front and back rows of seats positioned in the passenger cabin, a forward door that is pivotable between a closed position and an open position, and an aft door that is pivotable between a closed position and an open position.

Pivoting one of the forward door or the aft door from the closed to the open position causes the other of the forward door or the aft door to pivot from the closed position to the open position. In a preferred embodiment, the body includes a side opening, and, in their closed positions, the forward and aft doors are positioned in the side opening. The side opening includes a front row access portion (where a passenger can enter the front row), a back row access portion (where a passenger can enter the back row) and a cargo hold access portion (where a passenger can reach into the cargo hold to put luggage in or remove luggage). Preferably, in the closed position, the forward door blocks access to the front row access portion and the aft door blocks access to the back row access portion and the cargo hold access portion. In a preferred embodiment, the forward door pivots in one of a clockwise or a counter-clockwise direction and the aft door pivots in the other of the clockwise or the counter-clockwise direction.

In a preferred embodiment, the divider member separates the passenger cabin from the cargo hold such that a passenger in the passenger cabin cannot access the cargo hold when the front and aft doors are in the closed positions. Preferably, the cargo hold includes a shelf therein that is pivotable between a stowed and a deployed position. When the shelf is in the deployed position the cargo hold is divided into upper and lower storage sections. In a preferred embodiment, the divider member includes a ledge, and in the deployed position the shelf rests on the ledge.

In a preferred embodiment, pivoting one of the forward door or the aft door from the open position to the closed position causes the other of the forward door or the aft door to pivot from the open position to the closed position. Preferably, the aircraft is a vertical take-off and landing aircraft and is not a helicopter. As used herein, helicopter refers to a traditional helicopter with a large central rotor. In another embodiment, the aircraft can be a traditional helicopter.

In accordance with another aspect of the present invention there is provided an aircraft that includes a body that defines a cabin interior and a longitudinal axis, a front row and a back row positioned in the cabin interior. The front row includes a first front seat and a second front seat. The first and second front seats are angled away from one another. The first front seat is angled outwardly such that it forms a first acute angle with the longitudinal axis and the second front seat is angled outwardly such that it forms a second acute angle with the longitudinal axis. The first and second acute angles are approximately the same. In a preferred embodiment, the back row includes a first back seat and a second back seat. The first and second back seats are angled away from one another. The first back seat is angled outwardly such that it forms a third acute angle with the longitudinal axis, the second back seat is angled outwardly such that it forms a fourth acute angle with the longitudinal axis, and the third and fourth acute angles are the approximately same. In a preferred embodiment, the first, second, third and fourth acute angles are approximately the same. However, they can also be different.

In a preferred embodiment, the aircraft of claim 1 includes a front bench seat assembly that includes the first front seat and second front seat. Preferably, the front bench seat assembly includes a center portion that separates the first front seat from the second front seat. In a preferred embodiment, the center portion includes a front edge and a rear edge, and the front edge has a greater dimension than the rear edge. The center portion is generally triangular or generally trapezoidal in shape.

In a preferred embodiment, the aircraft includes a cockpit positioned forward of the front row and a first foot space is defined on a first side of the cockpit and a second foot space is defined on a second side of the cockpit.

In accordance with another aspect of the present invention there is provided a bench seat assembly that includes a first seat that includes a seat portion and a back, a second seat that includes a seat portion and a back, and a center portion positioned between the first and second seats. The first seat is bifurcated by a first vertical plane, the second seat is bifurcated by a second vertical plane, and the center portion is bifurcated by a center vertical plane. The first seat is angled outwardly such that the first plane defines a first acute angle with the center plane, the second seat is angled outwardly such that the second plane defines a second acute angle with the center plane, and the first acute angle and the second acute angle are approximately the same. In a preferred embodiment, the center portion includes a front edge and a rear edge and the front edge has a greater dimension than the rear edge.

In a preferred embodiment, the center portion includes a drawer that is movable between an open and a closed position. The drawer includes a front edge and a rear edge and the front edge has a greater dimension than the rear edge. In a preferred embodiment, the center portion includes a cover that is movable between an open and a closed position. The cover includes a front edge and a rear edge and the front edge has a greater dimension than the rear edge. An embodiment is contemplated where the center portion includes both a cover and a drawer. In a preferred embodiment, the center portion includes a cushion thereon that includes a front edge and a rear edge. The front edge has a greater dimension than the rear edge. Preferably, the center portion is generally triangular or generally trapezoidal in shape. In a preferred embodiment, the center portion includes a baby seat thereon.

In a preferred embodiment, the present invention provides simultaneous access to a vehicle's passenger cabin and the cargo hold when the doors are open and simultaneously closes the passenger cabin and cargo hold. It therefore enables passengers to themselves access the vehicle's cargo hold during boarding and deboarding, but not during flight or travel.

In a preferred embodiment, the present invention is used in a vertical take-off and landing (VTOL) aircraft. However, this is not a limitation and the concepts disclosed herein can be used in other vehicles and aircraft. In a preferred embodiment, the VTOL is not a helicopter. In a preferred embodiment, the VTOL is an electric VTOL (referred to as an eVTOL). However, the VTOL can also be powered by gasoline or other fuel. The VTOL can be powered by rotors on the wings or elsewhere on the body. Furthermore, the aircraft can be manned (with a pilot) or unmanned (autonomous). In a preferred embodiment, the VTOL's passenger cabin (passenger zone) and cargo hold (cargo zone) are configured to enable the capability of one door/hatch to close both zones or allow access to both zones. Preferably, the passenger cabin is entirely accessible with two doors on one side of the vehicle. The forward door swings outwardly (e.g., clockwise) to allow ingress/egress to the forward passenger seat row (e.g., in a vehicle with two rows). The rear door swings outwardly (e.g., counterclockwise) pivoted from the aft vertical edge of the opening in the side of the vehicle, thereby exposing the rear passenger seat row and the cargo hold. The cargo zone holds the passenger's luggage and is preferably separated from the passenger cabin by a partition or divider member. In a preferred embodiment, no access between zones (cargo and passenger) is allowed during flight. In another embodiment, three doors on one or both sides can be used.

In a preferred embodiment, the present invention enables simple passenger ingress/egress with smooth lateral sliding between two lateral seating positions, seating for two, oriented towards the outboard or outside of the vehicle, which allows the passengers to face away from one another on a single bench and provides a sense of privacy.

In a preferred embodiment, the present invention provides a single seating apparatus or bench with the capability to seat one or two passengers. Multiple benches can be provided in a single passenger cabin. The bench contains two seating positions that are symmetrically angled away from the centerline of the vehicle. The angle preferably prevents the two adjacent passengers from being in each other's line of sight. The angled seating also aligns the passengers toward the outboard of the vehicle, which facilitate a window. Preferably, safety harnesses or seatbelts are provided for both passengers on the bench.

In a preferred embodiment, the spaces beside or either side of the pilot is used for passenger space (e.g., foot space). Enhanced outdoor views for passengers and connected services, such as phone charging (e.g., inductive phone charging).

Angled seating to compress the seats together while maintaining comfort levels for a short flight. The layout locates a "row" that contains two seat positions that are symmetrically angled away from the centerline of the vehicle. The angle also allows the front row passengers to use the space on the sides of the pilot or, in the case of an autonomous vehicle, the space on either side of one of the vehicle's components (e.g., engine). The two angled seats creates a zone or center portion that is generally triangular or trapezoidal in shape. Generally triangular or trapezoidal means that when viewed from above (in plan) the center portion generally look like a triangle or trapezoid. Some seats have a slight curve on their outer edge. Also, the front and rear edges of the center portion may have a slight curve or may not be completely straight. Furthermore, the corners may be rounded. Therefore, if the seat or front or rear edges of the center portion have a slight curve or the corners are curved or rounded, this does not take them out of the definition of generally triangular or trapezoidal. This zone can be used for multiple purposes or variations. For example, the zone can be used for auxiliary features, such as ancillary services, as auxiliary storage, a rear facing infant seat or third passenger (in row) seating. The ancillary service variant enables a platform where passengers, VTOLs and third party vendors can connect and supply desired services. For example, the passenger can use a device with the appropriate software to order an item, e.g., food or drinks prior to flight. The third party vendor (or VTOL) can then prepare and fulfill the customer's order. For example, this can be done by the VTOL and third party vendor connecting via a vertiport rendezvous where the order is inserted into the ancillary service unit in the triangular zone (or other location) designated to the passenger that ordered the service. When the passenger arrives to the VTOL the order can be verified and accepted.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
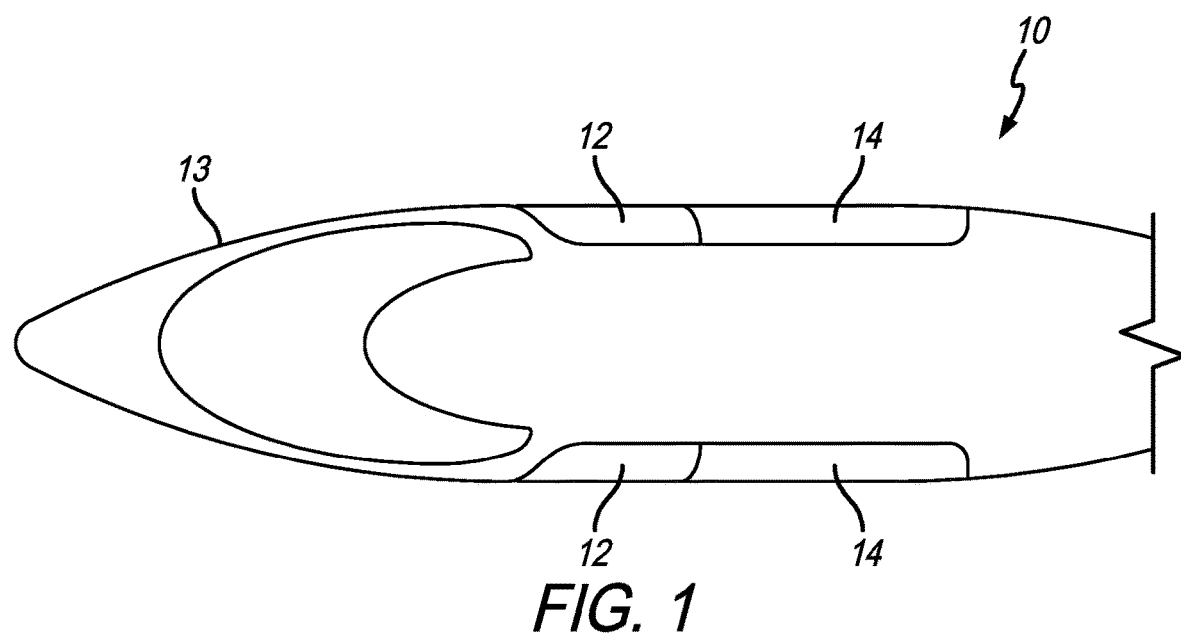
FIG. 1 is a plan view of a VTOL aircraft with forward and aft doors in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-13 show a VTOL aircraft 10 and components therefor that include a number of inventive features.

FIGS. 1-5 include forward and aft doors 12 and 14 that open simultaneously and are positioned in a side opening 11 of the aircraft body 13. In a preferred embodiment, the forward and aft doors 12 and 14 are operatively connected such that opening the forward door 12 or moving the forward door 12 from the closed to the open position causes the aft door 14 to also move from the closed to the open position. Furthermore, opening the aft door 14 or moving the aft door 14 from the closed to the open position causes the forward door 12 to also move from the closed to the open position. The simultaneous opening and closing can be accomplished by mechanical mechanisms, electric mechanisms or a combination of both.

Figure 2:
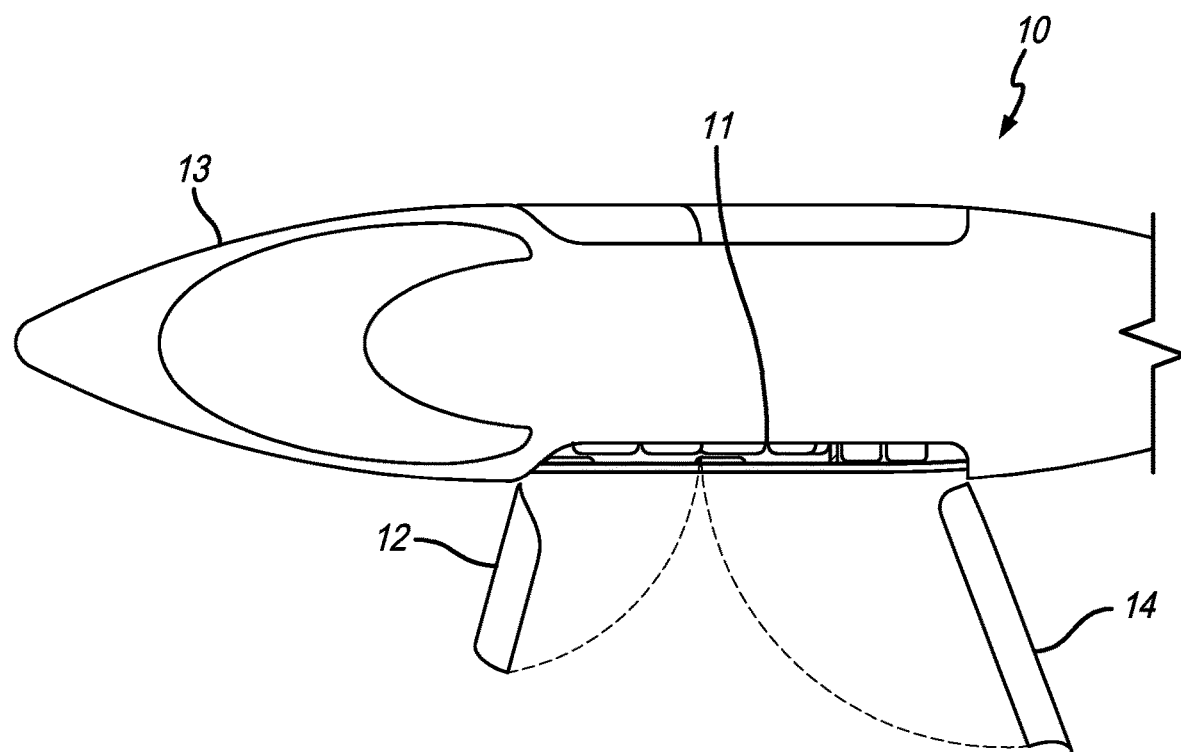
FIG. 2 is a plan view of the aircraft of FIG. 1 with the forward and aft doors in the open position.
Figure 3:
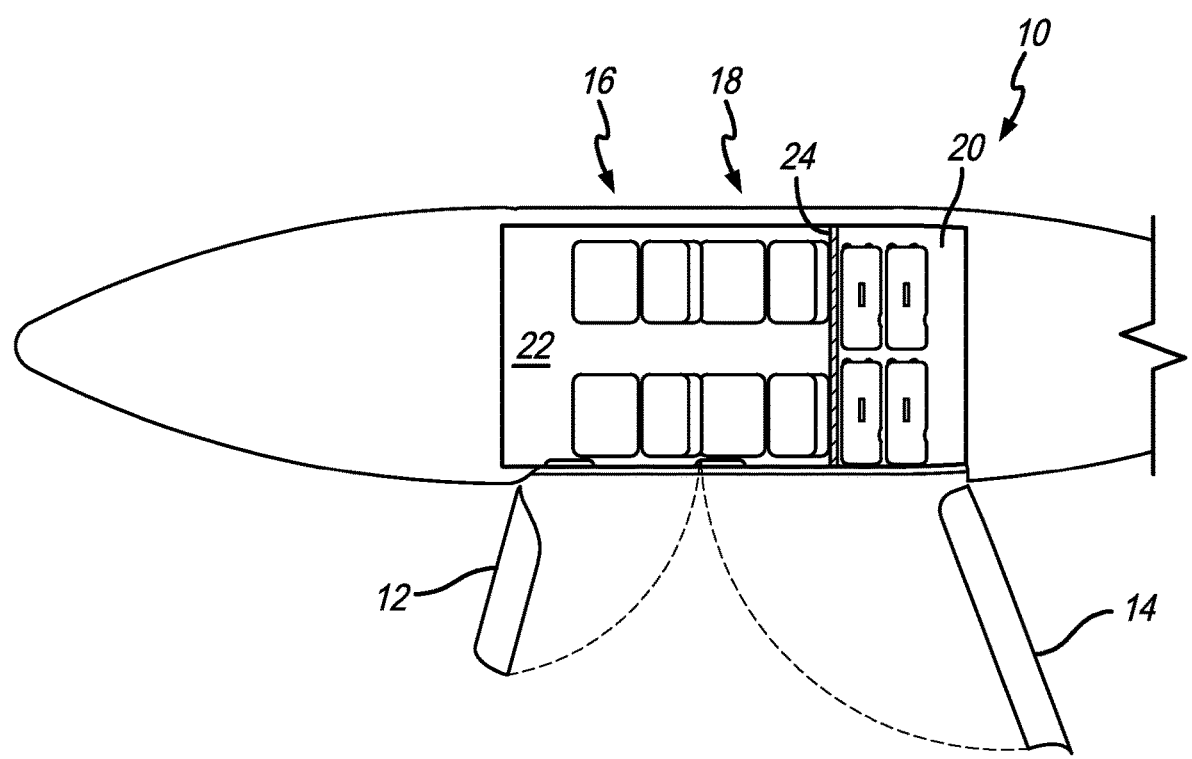
FIG. 3 is a plan view of the aircraft of FIG. 1 with the forward and aft doors in the open position and showing the passenger area and cargo hold.

The dashed lines in FIGS. 2 and 3 show the closing path of the doors. As shown, the forward door 12 provides access to the front row of seats 16 and the aft door 14 provides access to the back row of seats 18 and the cargo hold 20. The cargo hold 20 is separated from the passenger cabin 22 by a divider member 24, which prevents passengers seated in the back row 18 from reaching back into the cargo hold 20. In another embodiment, the divider member can be omitted and access to the cargo hold 20 can be possible from the passenger area.

Figure 4:
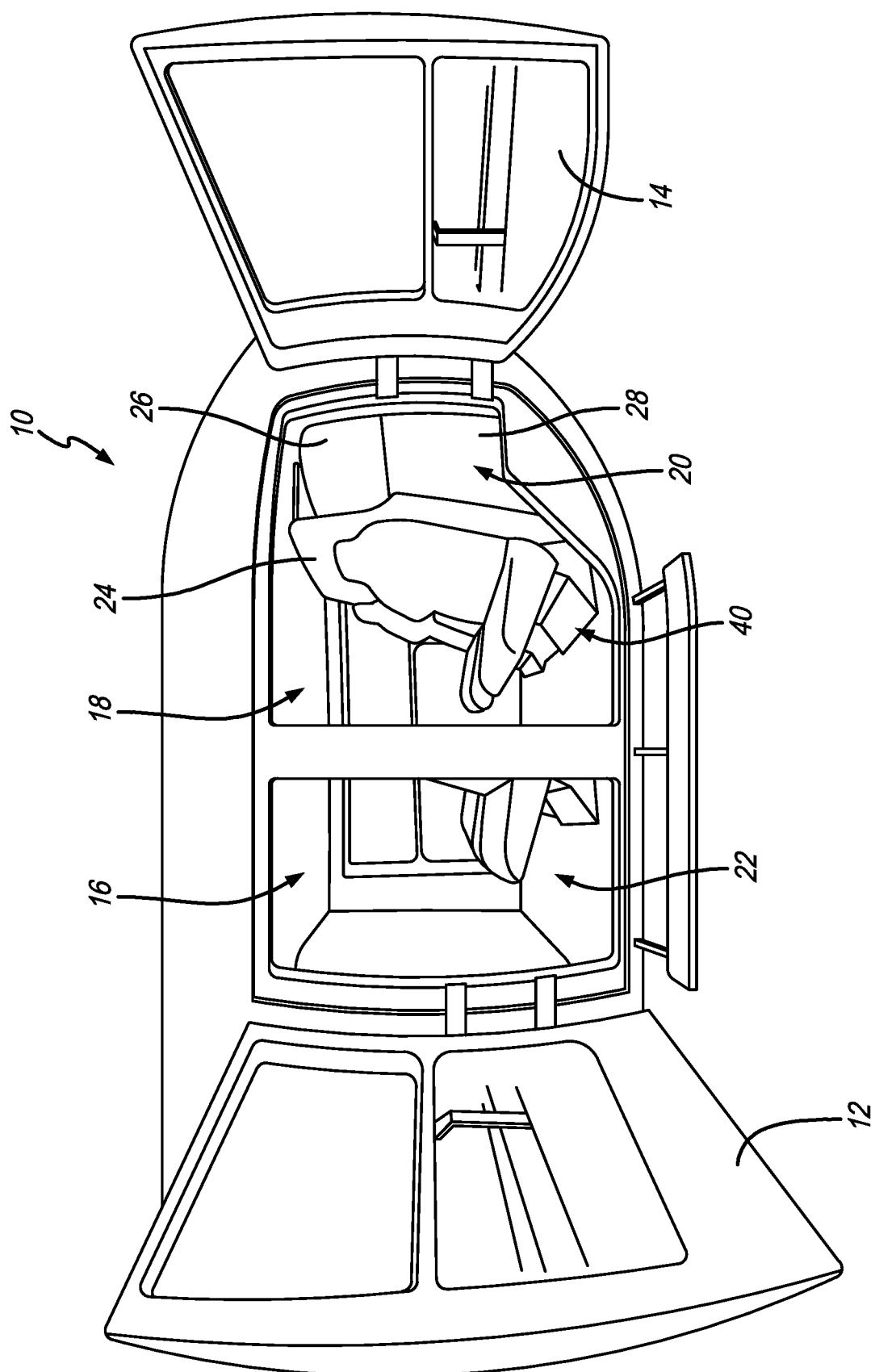
FIG. 4 is a perspective view of the aircraft with the forward and aft doors open.
Figure 5:
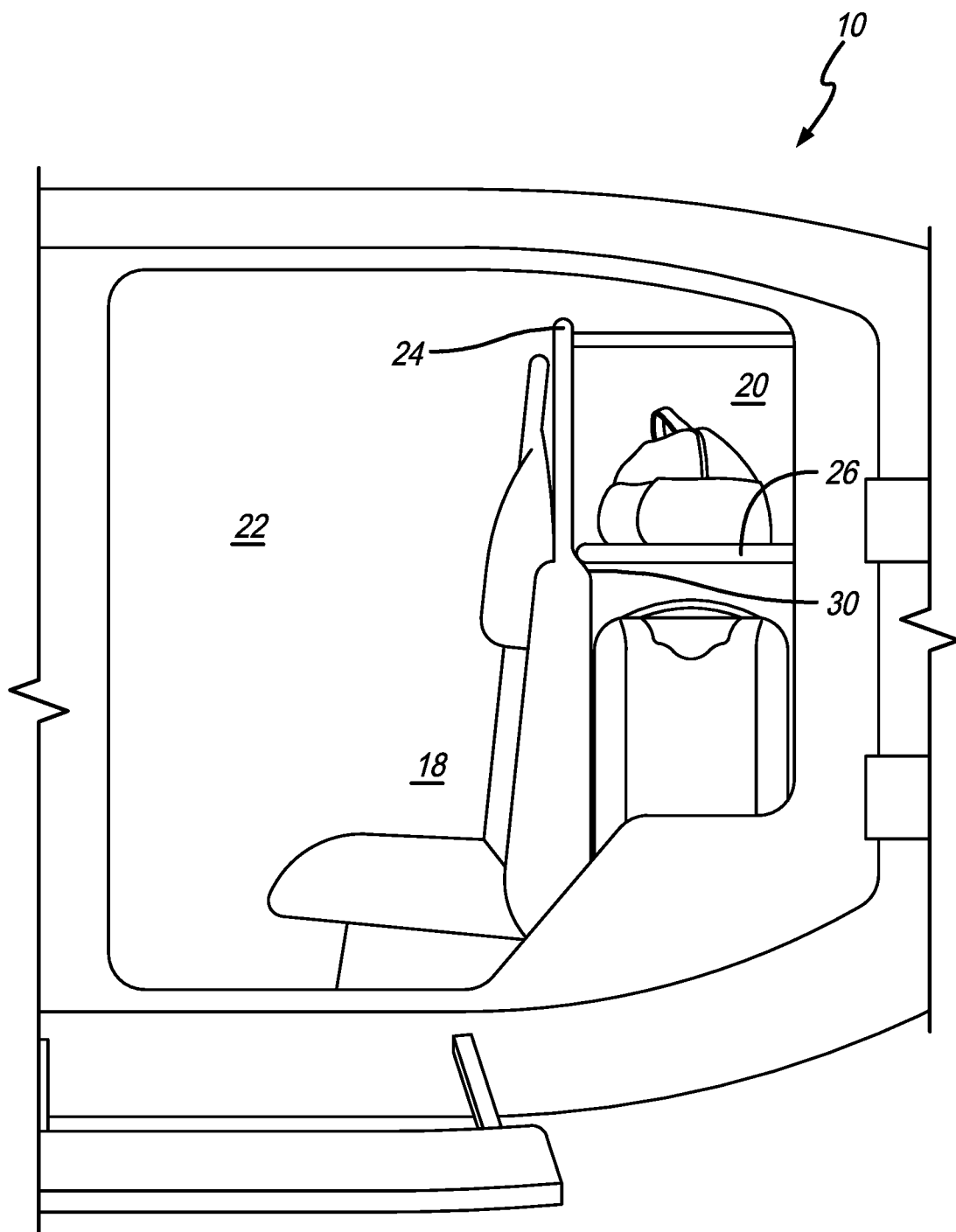
FIG. 5 is side elevational view of the rear seat row and the cargo hold.

As shown in FIGS. 4 and 5, in a preferred embodiment, the cargo hold 20 includes a pivotable shelf 26 that is movable between a stowed position (see FIG. 4) and a deployed position (see FIG. 5). Preferably, the shelf 26 is pivotably connected to the back wall 28 of the cargo hold 20 and pivots downwardly such that it rests on a ledge 30 on the divider member 24. The shelf 26 divides the cargo hold 20 into upper and lower storage sections. In another embodiment, more than one shelf can be included. Any seating arrangement is within the scope of the present invention. As shown in FIGS. 2-3, the aircraft 10 can include forward facing seats that are separate within each row, or, as shown in FIG. 4-13, the aircraft 10 can include bench seats that are angled outwardly.

Figure 6:
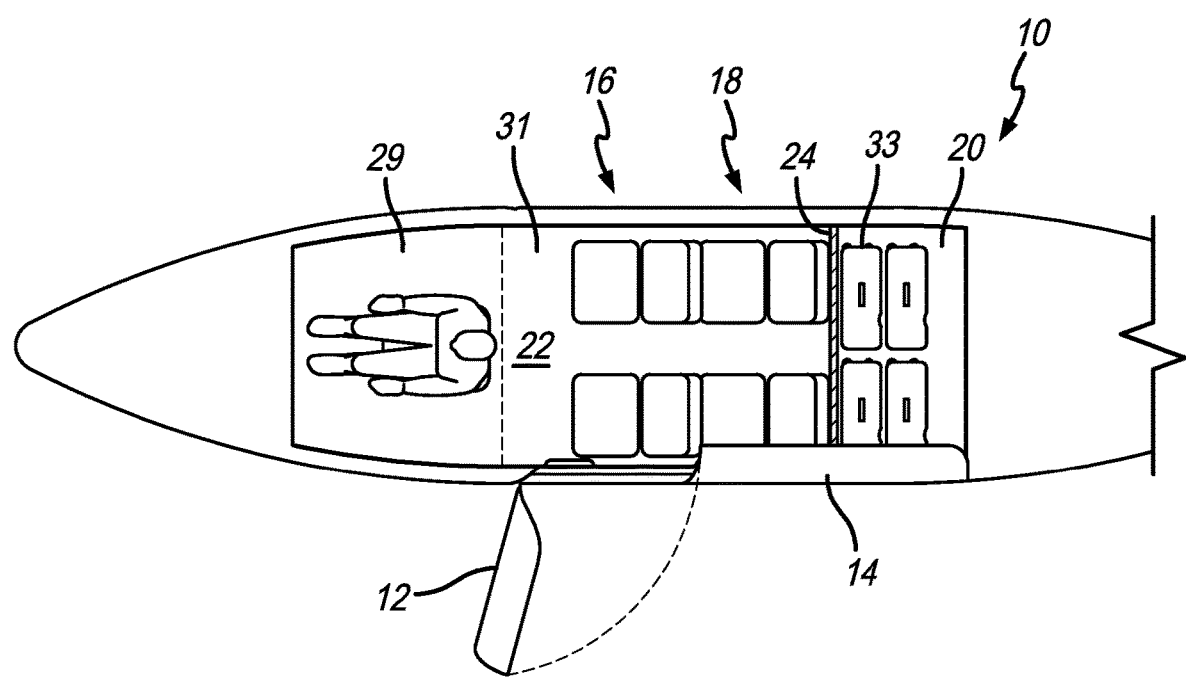
FIG. 6 is a plan view of a VTOL aircraft with forward and aft doors that open independently and with the forward door open in accordance with a preferred embodiment of the present invention.
Figure 7:
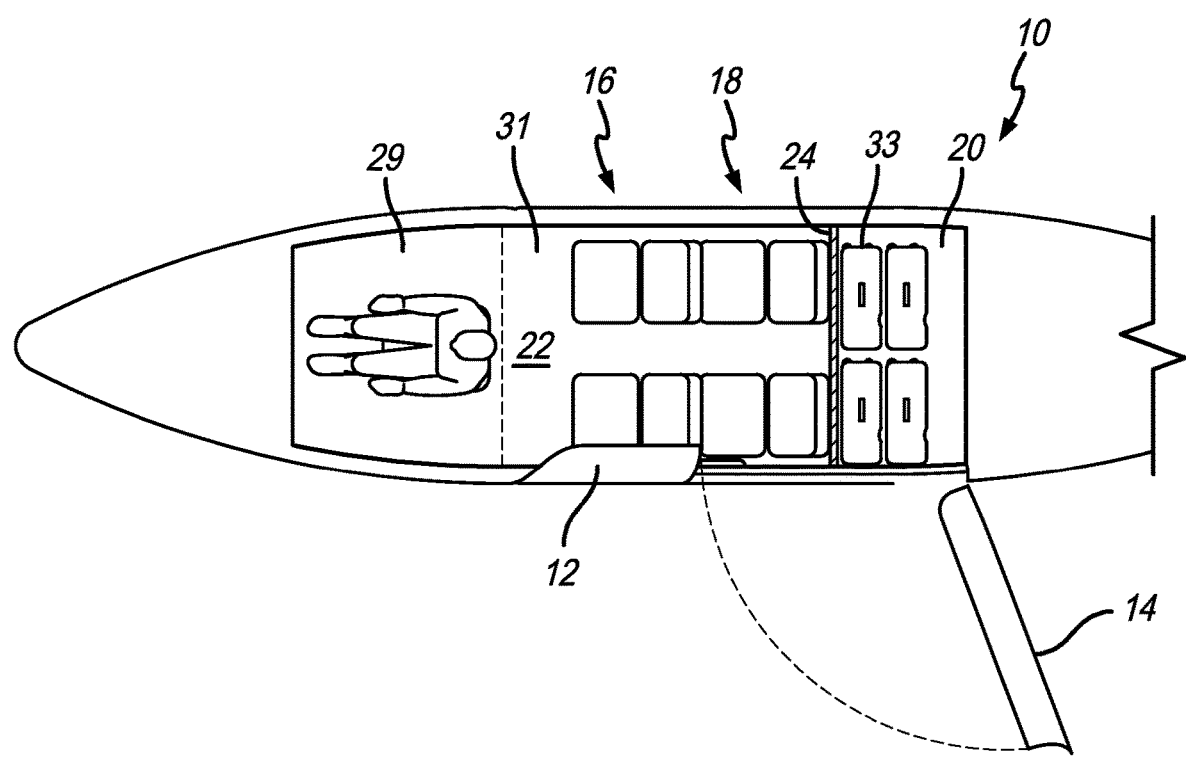
FIG. 7 is a plan view of the aircraft of FIG. 6 with the aft door in the open position.
Figure 8:
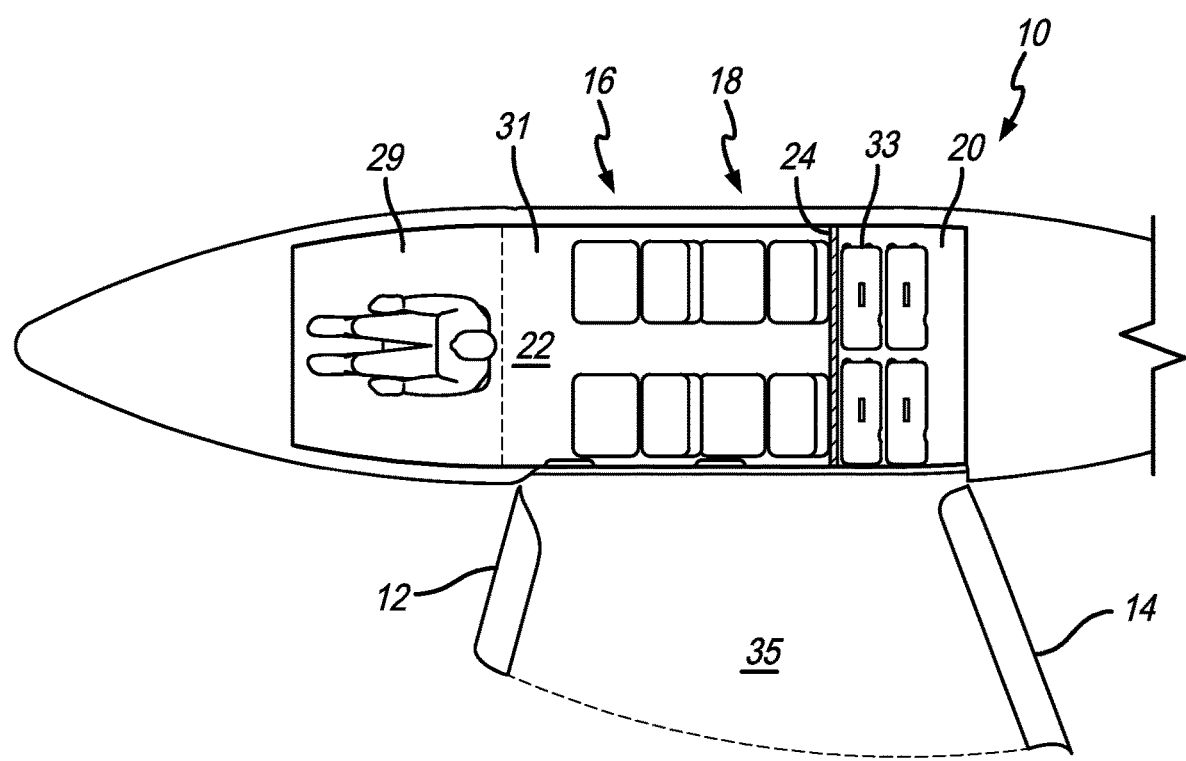
FIG. 8 is a plan view of a VTOL aircraft with the forward and aft doors open and defining a protected area for passengers to enter and exit.

FIGS. 6-8 show another embodiment where the forward and aft doors 12 and 14 open separately or independently to provide access to the various zones. As shown in FIG. 6, the aircraft 10 includes a pilot zone 29 (cockpit or flight deck), passenger zone 31 and cargo zone 33. Opening the forward door 12 provides access to the front row 16, but with the aft door closed 14, the back row 18 and the cargo hold 20 cannot be accessed. As shown in FIG. 7, opening the aft door 14 provides access to the back row 18 and the cargo hold 20, but with the forward door closed 12, the front row 16 cannot be directly accessed. The forward door 12 can also be large enough (together with opening 11) to provide access to the pilot zone 29. In another embodiment, the pilot zone can be accessed by a separate door. In another embodiment, the forward door only provides access to the pilot zone and the aft door provides access to the entire passenger zone (the front and back rows) and the cargo hold.

As shown in FIG. 8, in a preferred embodiment, when the forward and aft doors 12 and 14 are in the open position, a protected area or space 35 for passengers to enter and exit is provided. Providing this space 35 and allowing the passengers to access the cargo zone and passenger zone from the same space can help reduce turnaround time when compared to other aircraft where the passenger zone access is in a separate location from where the cargo hold.

Figure 9:
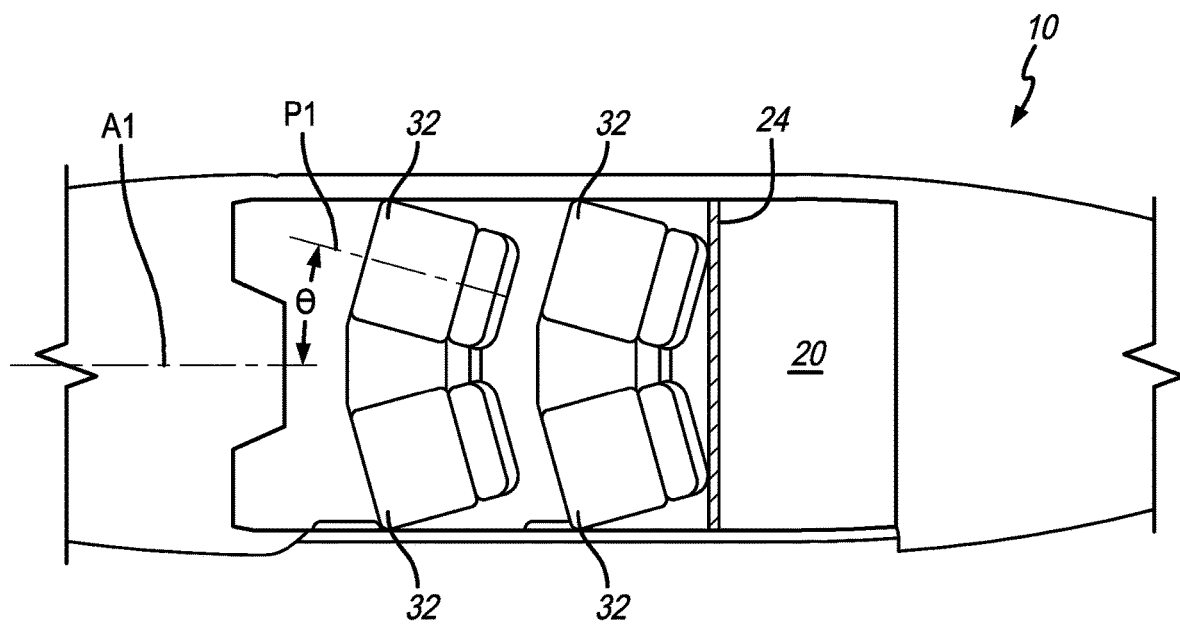
FIG. 9 is a top plan view of a VTOL aircraft with angled seating.
Figure 10:
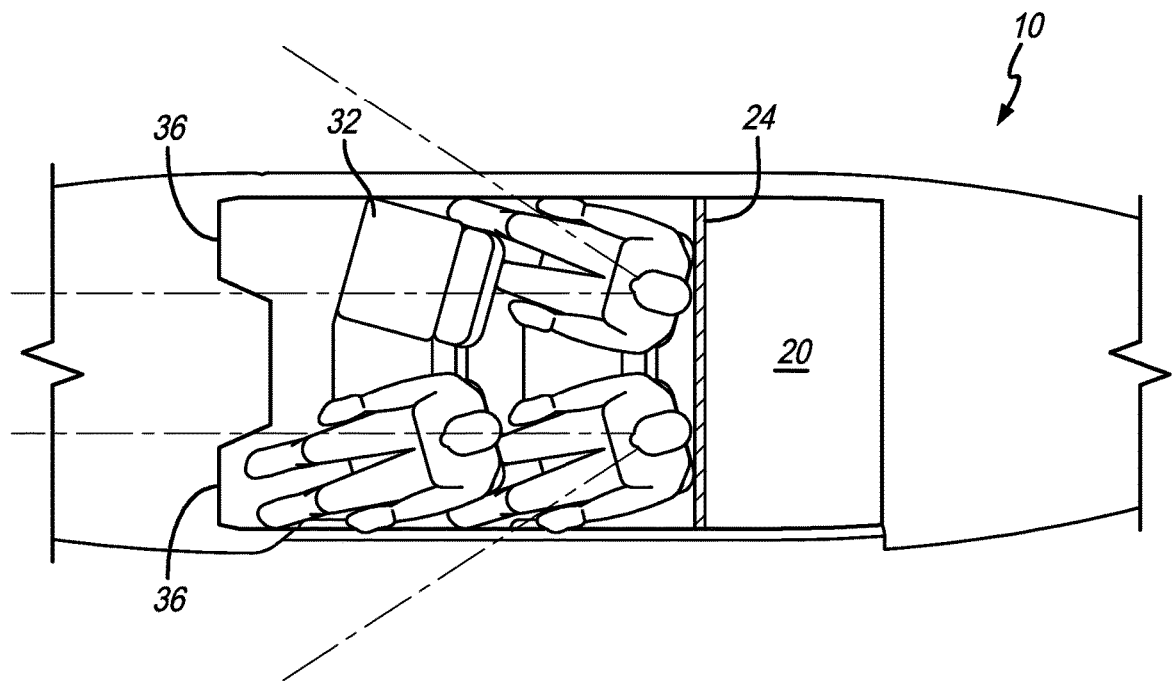
FIG. 10 is a top plan view of the aircraft of FIG. 9 with passengers therein and showing the passengers' lines of site.
Figure 11:
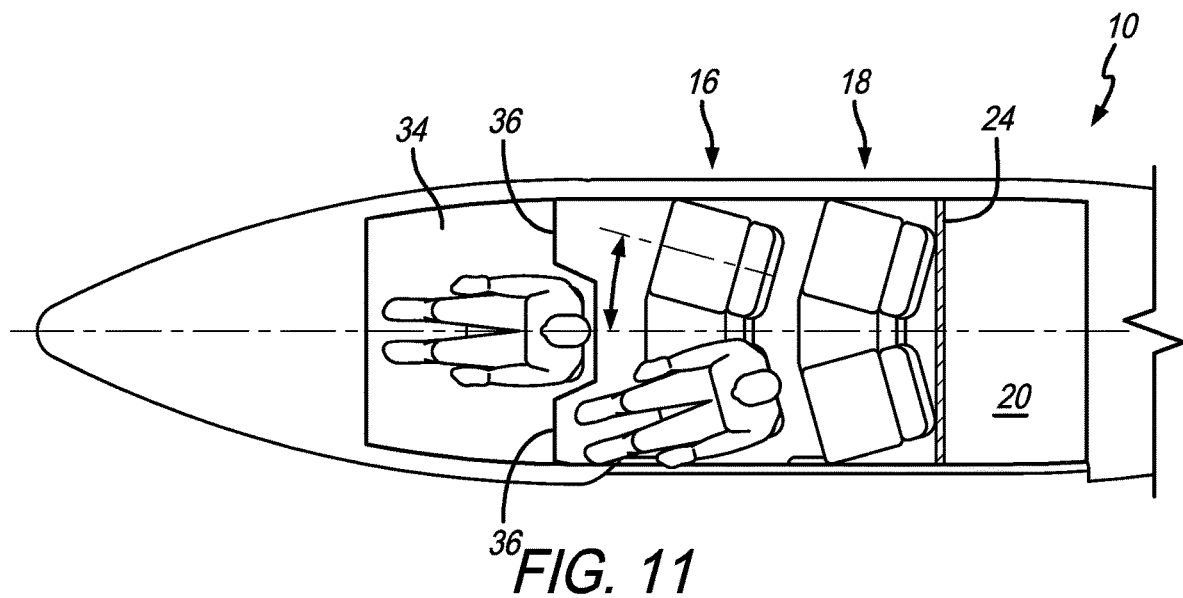
FIG. 11 is a top plan view of the aircraft of FIG. 9 that includes a pilot space.

FIGS. 9-11 show plan views of a seating arrangement that includes the front and back rows 16 and 18 with angled seats 32. The angle preferably prevents the two adjacent passengers from being in each other's line of sight. The angled seating also aligns the passengers toward the outboard of the aircraft 10. FIG. 9 shows an angle between the seat 32 (or a vertical plane P1 that bifurcates the seat) and the longitudinal axis A1 of the aircraft 10 (or a vertical plane that bifurcates the bench seat assembly and/or the center portion). Preferably, the angle is symmetrical for the seats 32 on both sides of the aircraft 10. Also, preferably, the seats in both rows include approximately the same outward angle. The angle can be any angle between 1° and 89°, but is preferably less than 45°. The embodiment shown in the drawings includes an angle of 10° off the center line for both seats. FIG. 10 shows passengers seated in some of the seats and gives an example of their sight lines. Approximately the same means that the angles are within at least a few degrees of one another.

FIG. 11 shows a cockpit 34 that includes a seat for a pilot. In a preferred embodiment, the cabin 22 includes foot space 36 on opposite sides of the pilot where the front row passengers can place their feet. FIGS. 9-10 also show the foot space 36 on opposite sides of a forward area of the aircraft. As used herein, the term cockpit does not necessarily mean that room or seating is provided for a pilot. Accordingly, the space in FIGS. 9-10 (a pilotless embodiment) is still referred to as cockpit 34. Foot space for the passengers in the back row can be provided on either side of the front row seats.

Figure 12:
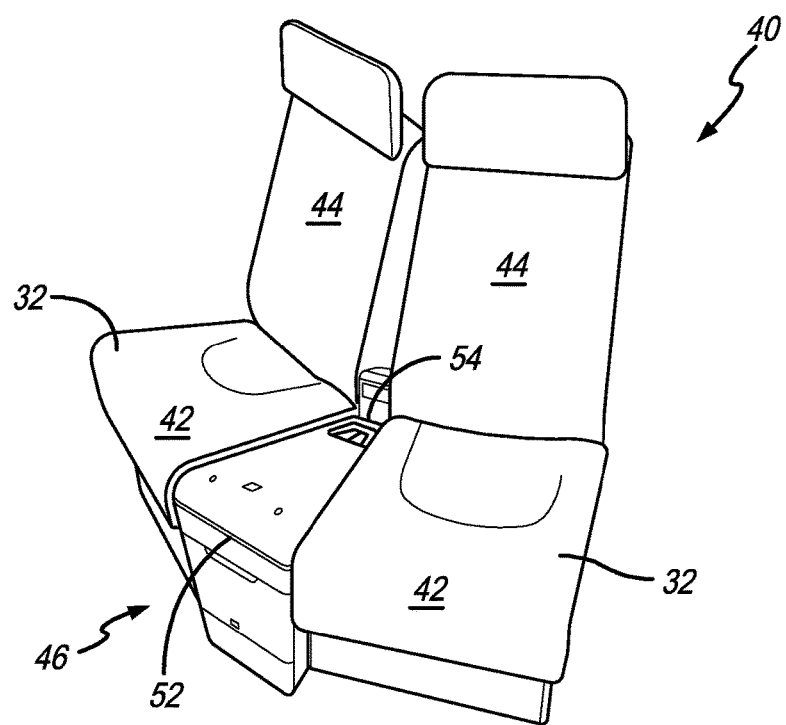
FIG. 12 is a perspective view of a bench contains two seating positions that are symmetrically angled away from one another.
Figure 13:
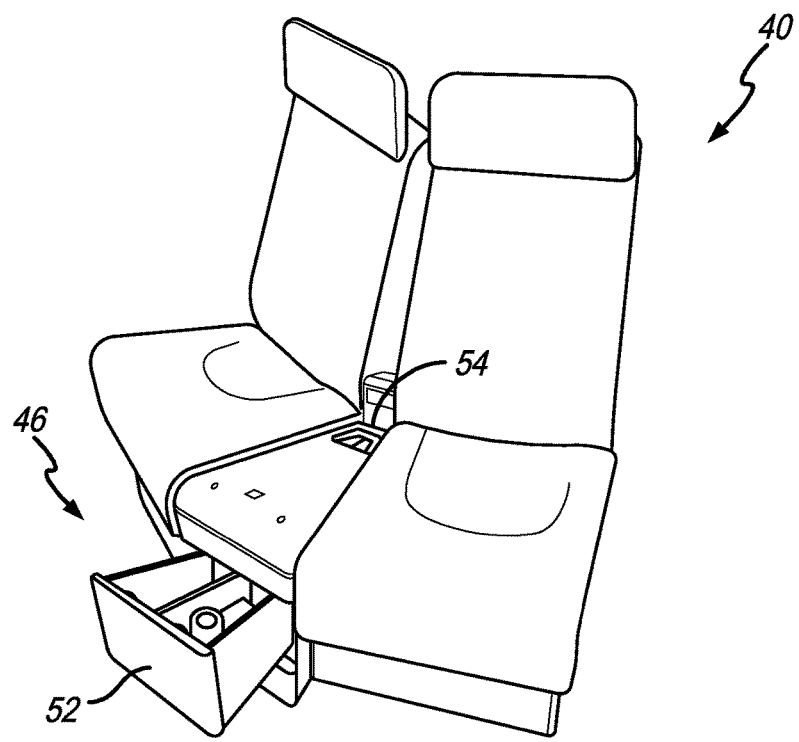
FIG. 13 is a perspective view of the bench including a storage drawer.
Figure 14:
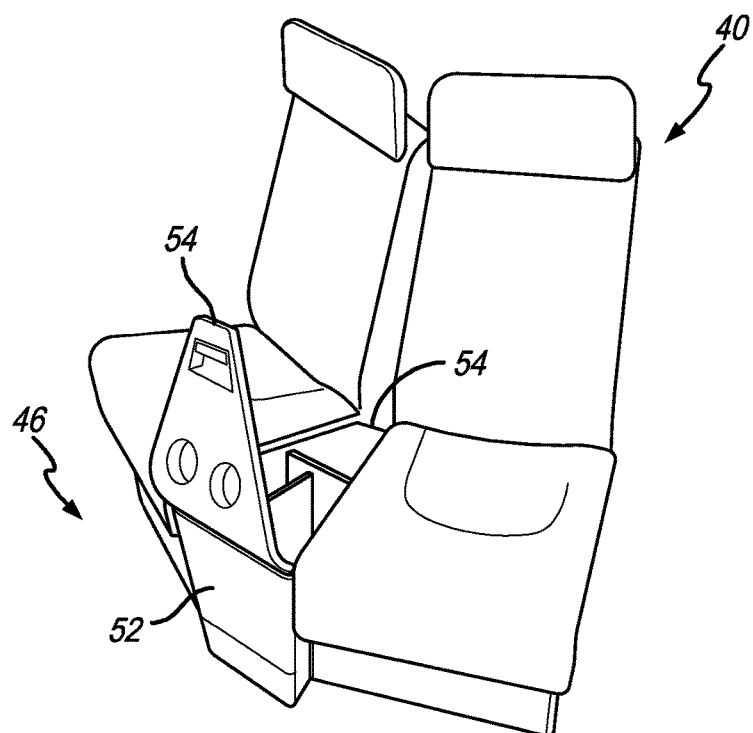
FIG. 14 is a perspective view of the bench including an openable top for storage.

FIGS. 12-16 show various configurations of bench seat assemblies 40 that include at least two seats 32 with a seat portion 42 and a back 44. The seats 32 are angled outwardly. In a preferred embodiment, the bench seat assembly 40 includes a center portion 46 that can include different components therein. FIGS. 12-14 show the center portion 46 with storage capabilities. FIG. 13 shows the center portion 46 with a drawer 48 that opens forwardly. FIG. 14 shows the center portion 46 with a cover 50 that opens upwardly to provide access to storage therein. As is shown in FIGS. 13-14, the center portion 46, drawer 48 and cover 50 are shaped such that they fit into the center portion 46. Therefore, they each have a front edge or surface 52 that has a wider or longer dimension that a rear edge or surface 54.

Figure 15:
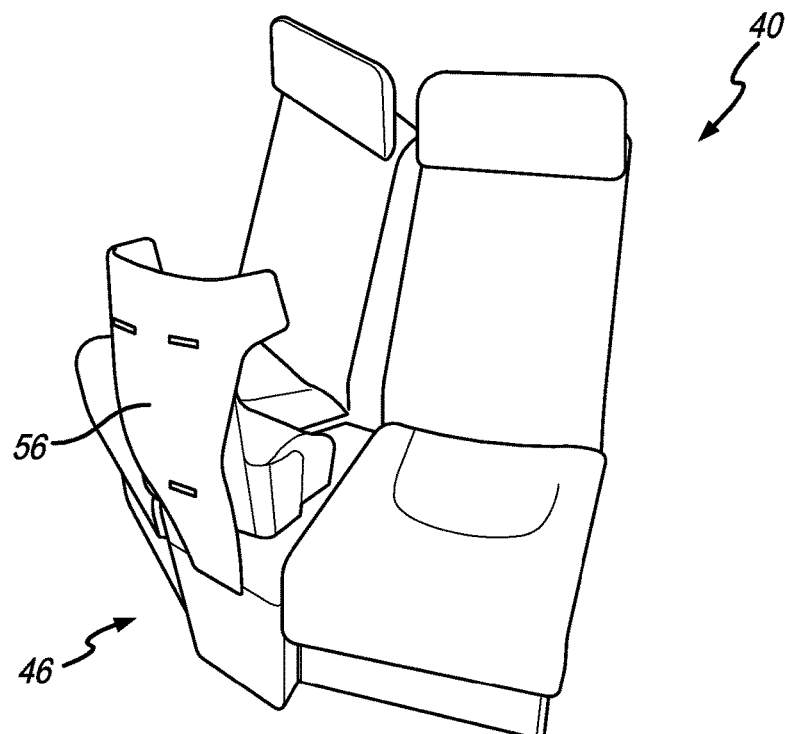
FIG. 15 is a perspective view of the bench including a child seat.
Figure 16:
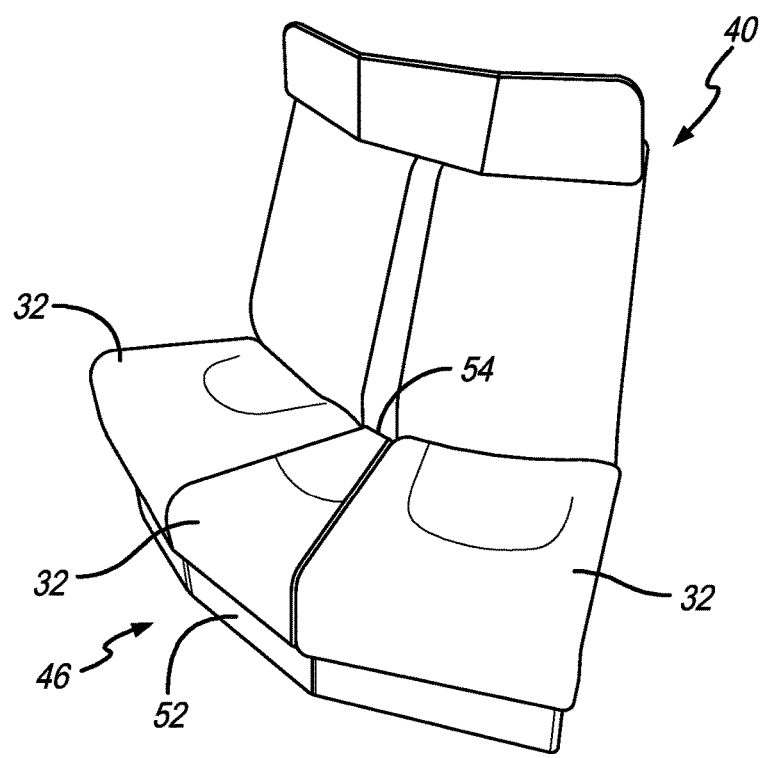
FIG. 16 is a perspective view of the bench including a center seat.

FIG. 15 shows a bench seat assembly 40 with a baby seat 56 in the center portion 46. The baby seat can be stowable within the center portion 46 and can deploy into the position shown in FIG. 15. In another embodiment, the center portion 46 can include the requisite attachments so that a commercially available baby seat can be connected to the center portion 46. FIG. 16 includes another seat 32 or cushion in the center portion 46. This can provide seating for a third person in the row or can provide overlap for a larger person seated in either of the seats. It will be appreciated that any of the bench seating assemblies discussed herein can be included in any of the aircraft embodiments discussed herein.

Figure 17:
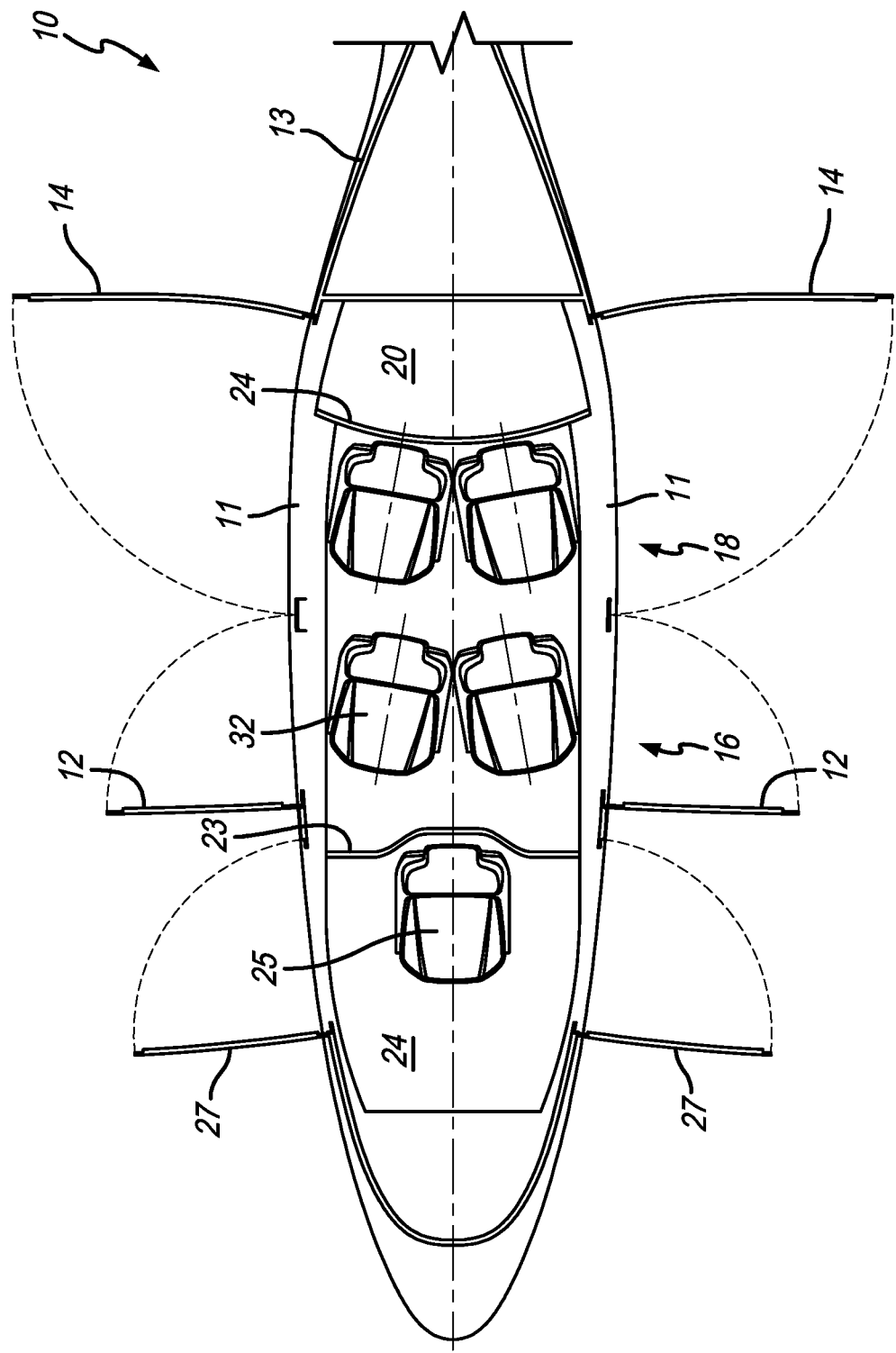
FIG. 17 is a top plan view of a VTOL aircraft with angled seating.

FIGS. 17-22 show further embodiments of the present invention that include separate seats in the first and second rows 16 and 18 as opposed to the bench seating shown in some of the other embodiments herein. It will be appreciated that any of the features discussed herein with respect to the other embodiments can also be included in the embodiments shown in FIGS. 17-22. FIG. 17 shows a plan view of an aircraft with symmetrical, outward angled seating, similar to the embodiments shown in FIGS. 9-11. FIG. 17 includes a contoured or curved divider member 24 that provides further space in the cargo hold 20. The curvature allows the divider to be positioned closer to the seat backs of the back row of seats, as opposed to a straight divider. This embodiment includes a central pilot seat 25, symmetrical angled passenger seats and symmetrical dividers between the various zones (divider member 24 between the cargo zone and the passenger zone, a front divider member 23 between the passenger zone and the pilot zone, and pilot doors 27 that provide access to the cockpit or pilot zone 29. Any of the doors taught herein can be openable in a manner differently than pivotable. For example, the doors can translate or slide (upwardly or sideways) between the open and closed positions.

Figure 18:
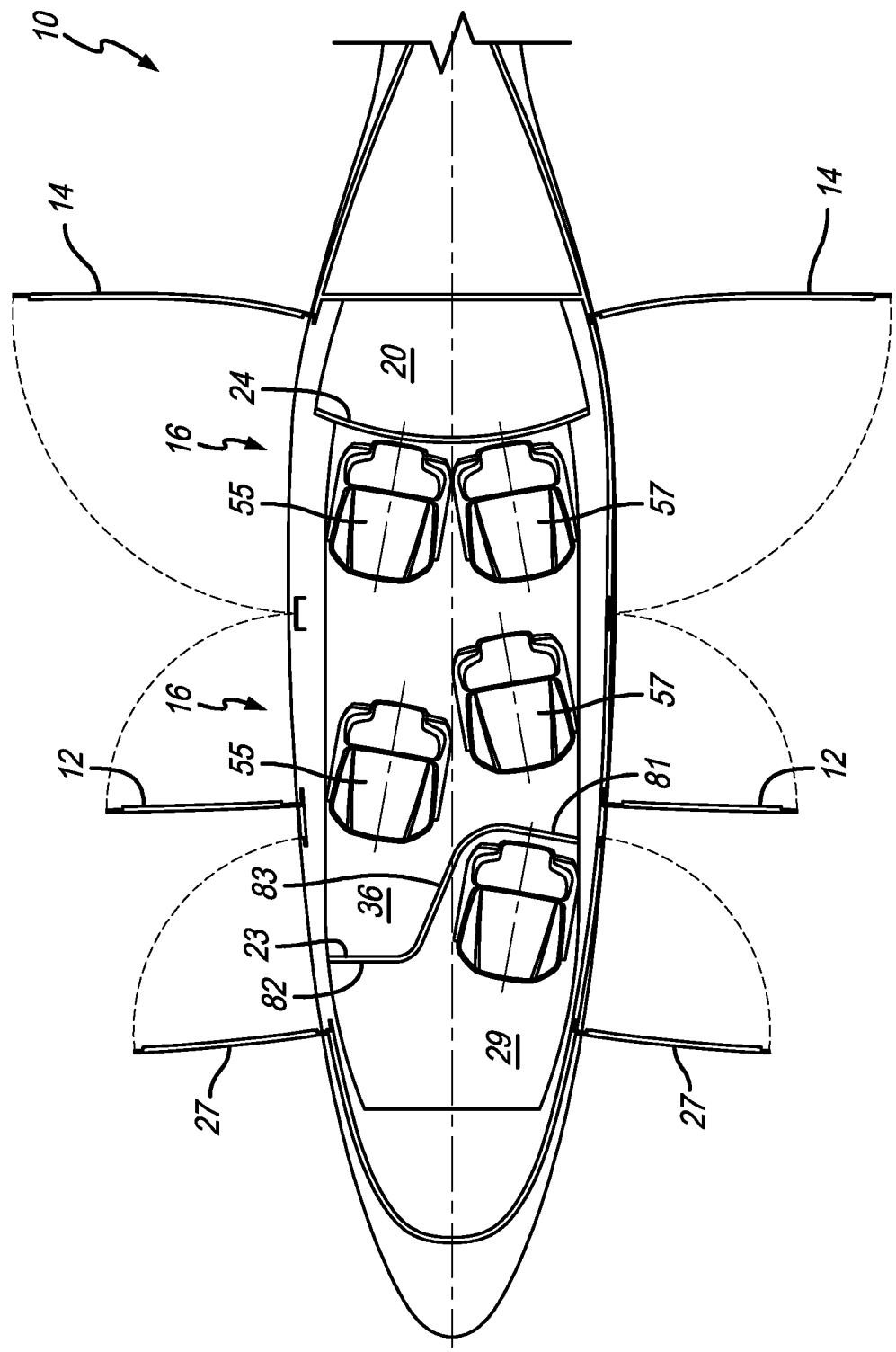
FIG. 18 is a top plan view of a VTOL aircraft with angled seating and staggered seating.

FIG. 18 shows another embodiment that includes at least one row with asymmetrical or staggered seating. In the embodiment shown in FIG. 18, the front row includes the staggered seating and the back row seats are not staggered. In another embodiment, the back row can include staggered seating. The pilot seat 25 is also positioned to one side (e.g., the port side) of the aircraft. This provides the ability to move the seat(s) 55 on the opposite side (e.g., the starboard side) forward, thus providing more leg room for the two seats 55 on the starboard side. This can be offered as premium seating by the carrier. The seats 57 on the port side have less leg room or pitch. The front divider member 23 also has an asymmetrical shape, as shown in FIG. 18, and includes a first section 81, a second section 82 and a connector section 83. The first section 81 is positioned rearwardly or aft of the second section 82 and the connector section 83 extends therebetween. In this embodiment, the forwardmost door 27 provides access to the pilot zone 29 and the forward starboard side seat 55. In another embodiment, all of the seats can face directly forwardly and not be angled outwardly or inwardly.

Figure 19:
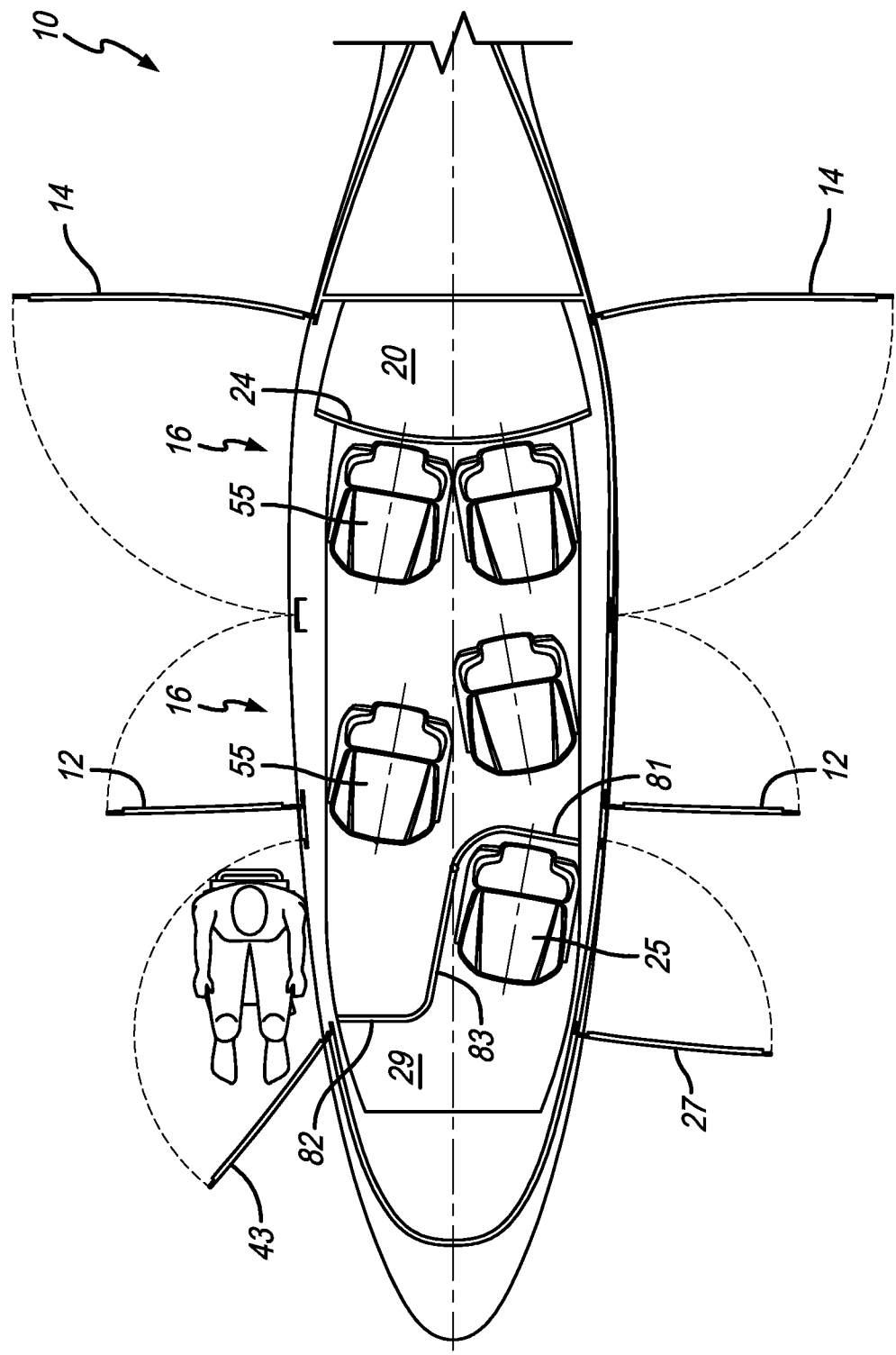
FIG. 19 is a top plan view of a VTOL aircraft with angled seating and staggered seating and PRM access.

FIG. 19 shows an embodiment similar to FIG. 18, but where the forward section 81 of the front divider member 23 is positioned forward of the forward door, thus allowing access to a person of reduced mobility (PRM). In this embodiment, the forwardmost door is referred to as the PRM door. The space in front of the forward seat 55 can be large enough to allow a wheelchair to fit therein so that a PRM can transfer from the wheelchair to the seat. In another embodiment, the space may be too small for a wheelchair.

Figure 20:
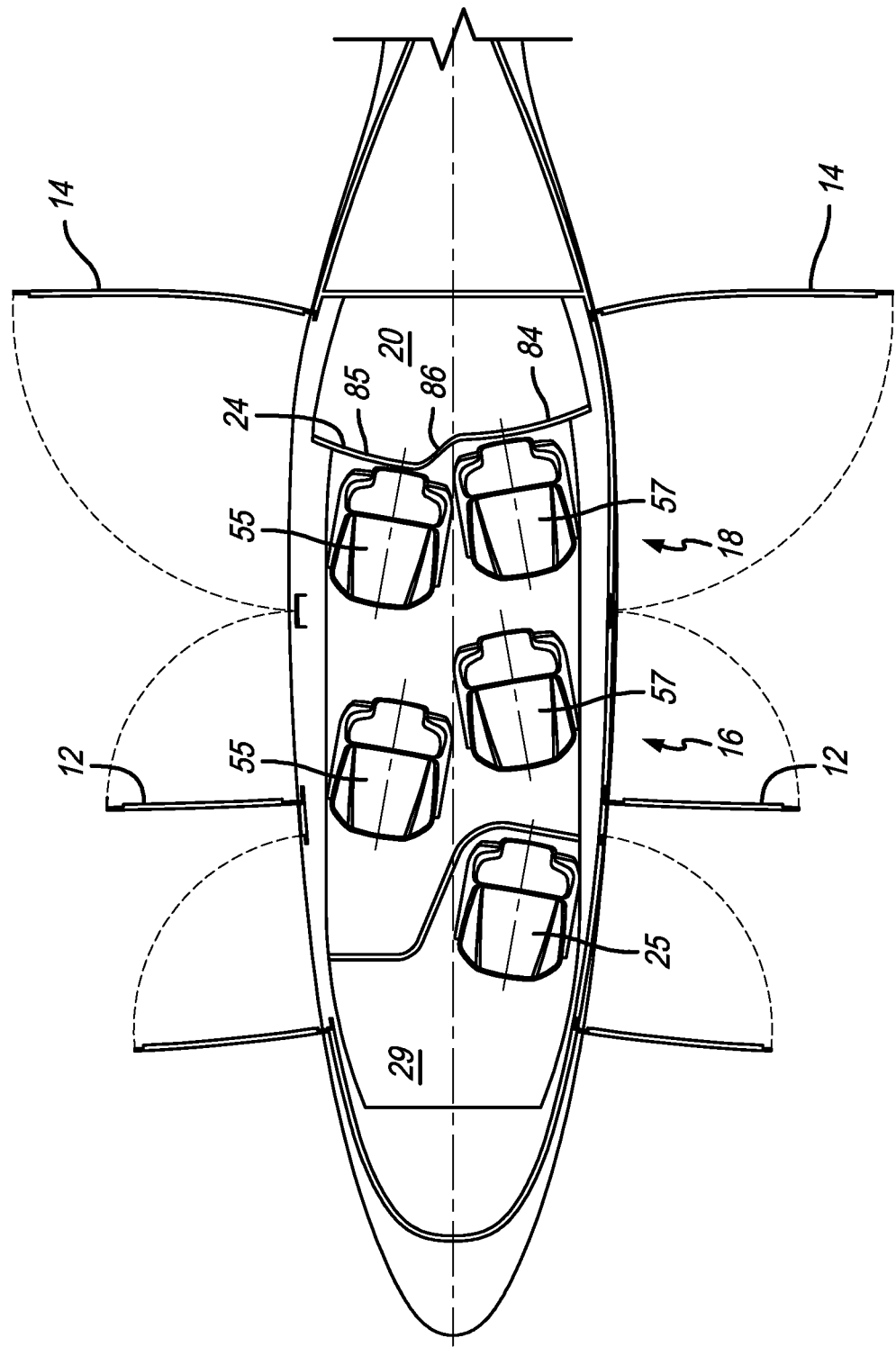
FIG. 20 is another top plan view of a VTOL aircraft with angled seating and staggered seating.

FIG. 20 shows an embodiment where both the front and back rows 16 and 18 include asymmetrical or staggered seating. The cargo hold divider member 24 also is asymmetrical, thus allowing additional space in the cargo hold. As a result of the starboard side rear seat being further forward than the port side rear seat, there is more cargo space on the starboard side than on the port side. In this embodiment, the cargo hold divider member 24 includes a first section 84, a second section 85 and a connector section 86. The first section 84 is positioned rearwardly or aft of the second section 85 and the connector section 86 extends therebetween. In other words, the distance between the starboard side of the divider member 24 and the back wall of the cargo hold is greater than the distance between the port side of the divider member 24 and the back wall of the cargo hold. In the embodiment shown in FIG. 20, the stagger between the seats in the front row is different (greater) than the stagger between the seats in the back row. In another embodiment, the stagger can be the same.

Figure 21:
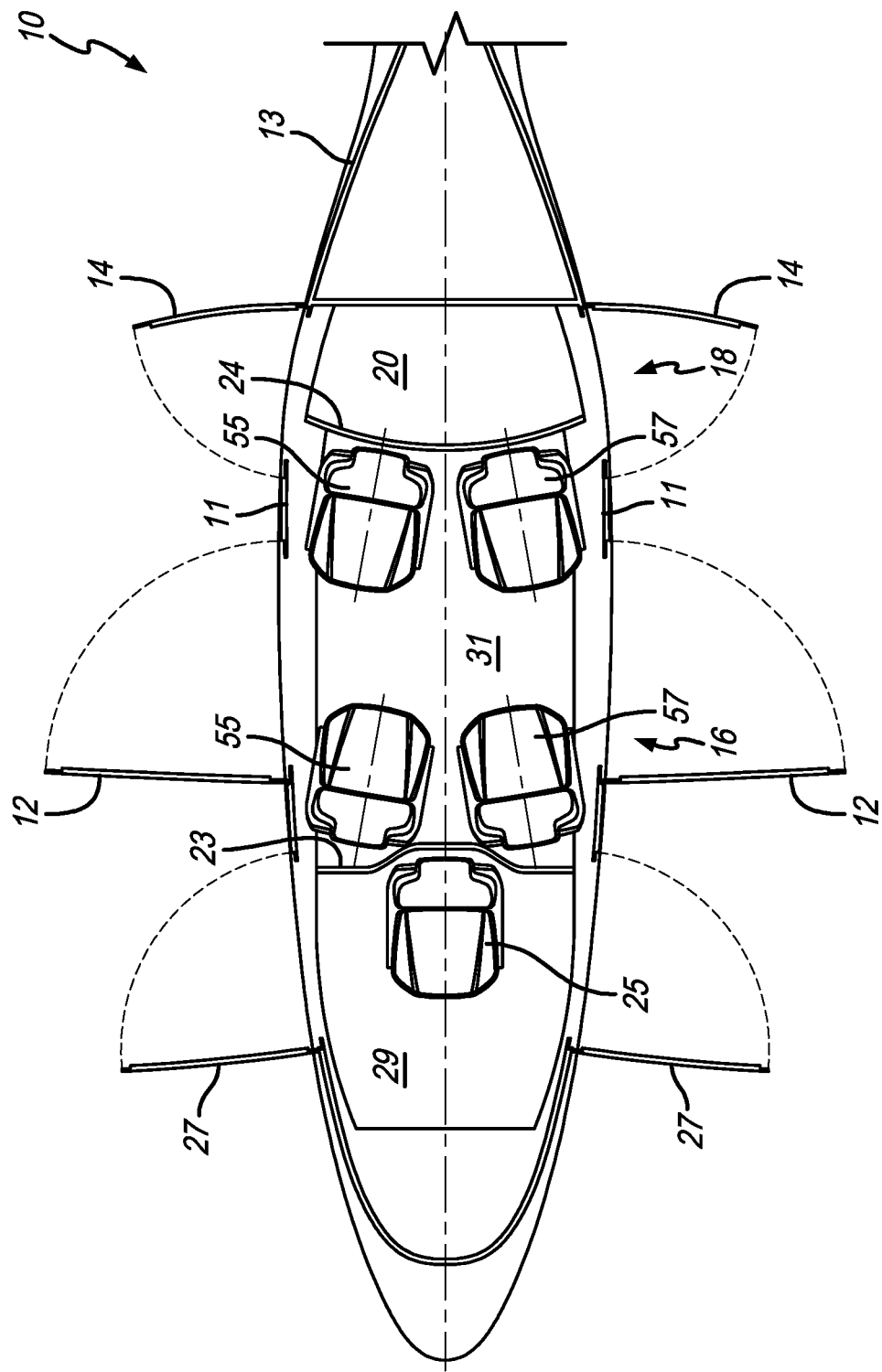
FIG. 21 is a top plan view of a VTOL aircraft with forward and aft facing symmetrical seats.
Figure 22:
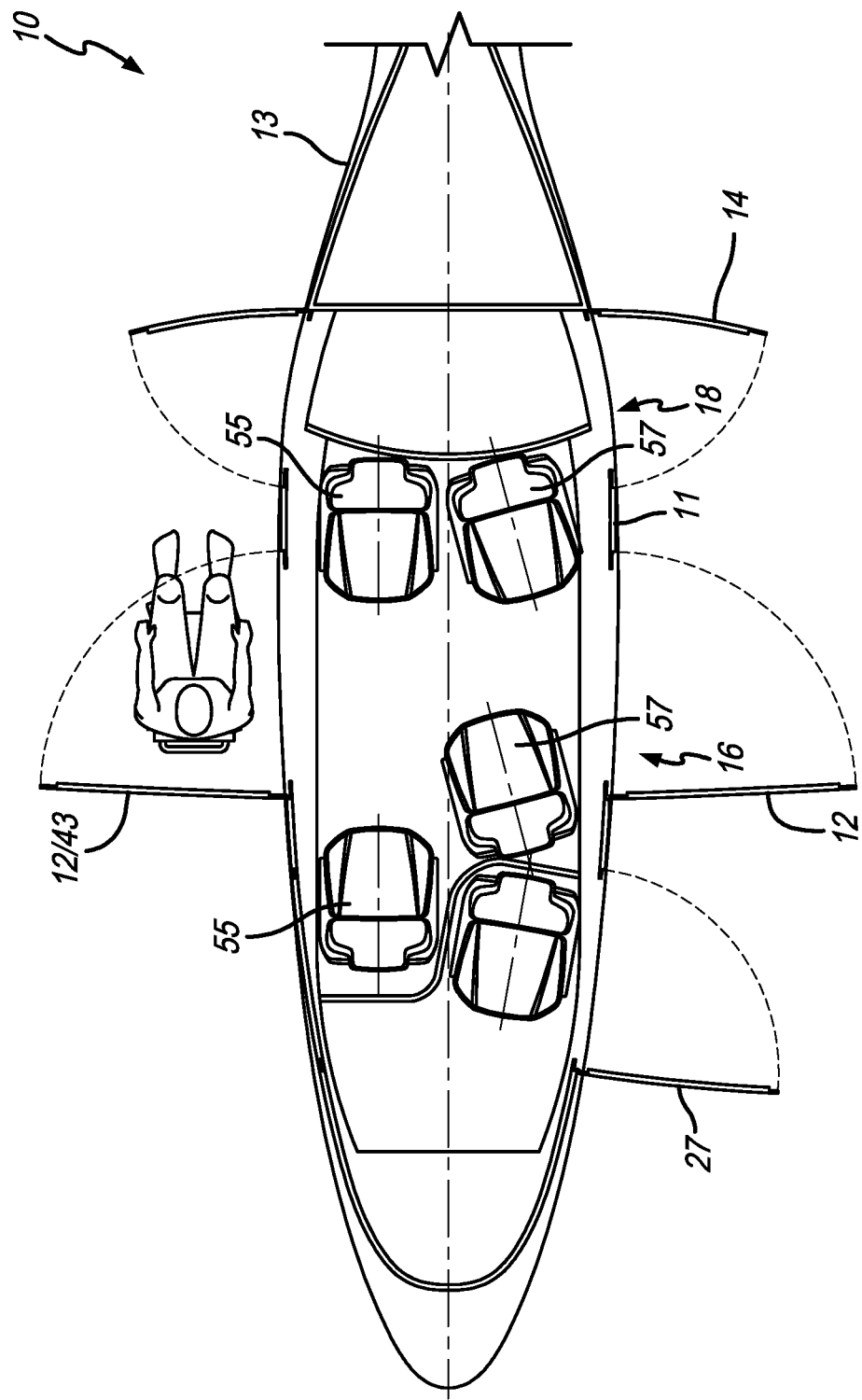
FIG. 22 is a top plan view of a VTOL aircraft with forward and aft facing asymmetrical seats.

FIGS. 21-22 show embodiments that include forward and aft facing seats. FIG. 21 includes symmetrical seating and FIG. 22 includes asymmetrical seating. Some cabin structure may not allow multiple doors for passenger access, in which case, a face to face seating arrangement may be the best option to allow passengers seated in the front and back rows 16 and 18 to enter through the same door (first door 12 in FIG. 21) and providing separate doors for the pilot (pilot door 27) and for the cargo zone (second door 14).

As shown in FIG. 21, the front row 16 includes aft facing sets that are angled inwardly instead of outwardly. The lines of sight for the passengers seated in the front and back rows are such that a passengers looking straight ahead is not looking directly at the other passenger seated on the same side of the cabin. Furthermore, the angle prevents facing passengers knees from interfering with one another.

FIG. 22 shows asymmetrical angled face to face seating (reducing knee interference and enabling extra foot space (e.g., that can be used for premium seating, oversized or limited mobility passengers). In FIG. 22, the seats 55 on the starboard side of the aircraft are not angled inwardly or outwardly. In another embodiment, these seats can be angled.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. An aircraft comprising:
    a body that defines a cabin interior, wherein the cabin interior includes a pilot zone, a passenger zone positioned aft of the pilot zone, and a cargo zone positioned aft of the passenger zone,
    front and back rows of seats positioned in the passenger zone,
    a forward door that is pivotable between a closed position and an open position, and
    an aft door that is pivotable between a closed position and an open position, wherein the pilot zone and the front row of seats are accessible and the back row and cargo zone are inaccessible from an exterior of the body when the aft door is in the closed position and the forward door is in the open position, and wherein the back row and cargo zone are accessible and the pilot zone and the front row of seats are inaccessible from the exterior of the body when the aft door is in the open position and the forward door is in the closed position.

2. The aircraft of claim 1 wherein the body includes a side opening, wherein when the forward and aft doors are in the closed position, the forward and aft doors are positioned in the side opening, wherein the side opening includes a pilot zone access portion, a front row access portion, a back row access portion and a cargo zone access portion.

3. The aircraft of claim 2 wherein in the closed position, the forward door blocks access to the pilot zone access portion and the front row access portion, wherein in the closed position, the aft door blocks access to the back row access portion and the cargo zone access portion.

4. The aircraft of claim 3 wherein the forward door pivots in one of a clockwise or a counter-clockwise direction, and wherein the aft door pivots in the other of the clockwise or the counter-clockwise direction.

5. The aircraft of claim 2 further comprising a divider member that separates the cargo zone from the passenger and pilot zones, wherein the divider member separates the passenger zone from the cargo zone such that a passenger in the passenger zone will not access the cargo zone when the aft door is in the closed position.

6. The aircraft of claim 1 wherein the cargo zone includes a shelf that is pivotable between a stowed and a deployed position, wherein when the shelf is in the deployed position the cargo zone is divided into upper and lower storage sections.

7. The aircraft of claim 6 wherein the divider member includes a ledge, and wherein in the deployed position the shelf rests on the ledge.

8. The aircraft of claim 4 wherein in the open position a protected area is defined between the forward and aft doors.

9. The aircraft of claim 1 wherein the aircraft is a vertical take-off and landing aircraft.

10. The aircraft of claim 1 wherein the front row includes a first front seat and a second front seat, wherein the first and second front seats are angled away from one another, wherein the first front seat is angled outwardly such that it forms a first acute angle with the longitudinal axis, wherein the second front seat is angled outwardly such that the second front seat forms a second acute angle with the longitudinal axis, wherein the first and second acute angles are approximately the same, wherein the back row includes a first back seat and a second back seat, wherein the first and second back seats are angled away from one another, wherein the first back seat is angled outwardly such that it forms a third acute angle with the longitudinal axis, wherein the second back seat is angled outwardly such that it forms a fourth acute angle with the longitudinal axis, and wherein the third and fourth acute angles are the approximately same.

11. The aircraft of claim 10 further comprising:
 a front bench seat assembly that includes the first front seat and second front seat, wherein the front bench seat assembly includes a center portion that separates the first front seat from the second front seat, wherein the center portion includes a front edge and a rear edge, and wherein the front edge has a greater dimension than the rear edge, and
 a back bench seat assembly positioned aft of the front bench seat assembly, wherein the back bench seat assembly includes the first back seat and second back seat, wherein the back bench seat assembly includes a center portion that separates the first back seat from the second back seat, wherein the center portion includes a front edge and a rear edge, and wherein the front edge has a greater dimension than the rear edge.

12. The aircraft of claim 11 wherein the center portion of the front bench seat assembly includes a drawer that is movable between an open and a closed position, wherein the drawer includes a front edge and a rear edge, and wherein the front edge has a greater dimension than the rear edge.

13. The aircraft of claim 11 wherein the center portion of the front bench seat assembly includes a cover that is movable between an open and a closed position, wherein the cover includes a front edge and a rear edge, and wherein the front edge has a greater dimension than the rear edge.

14. The aircraft of claim 12 wherein a first foot space is defined on a first side of the pilot zone, and wherein a second foot space is defined on a second side of the pilot zone.

15. An aircraft comprising:
 a body that defines a cabin interior and includes a side opening, wherein the cabin interior includes a pilot zone, a passenger zone positioned aft of the pilot zone, and a cargo zone positioned aft of the passenger zone,
 a divider member that separates the cargo zone and the passenger zone,
 front and back rows of seats positioned in the passenger zone,
 a forward door that is pivotable between a closed position and an open position, and
 an aft door that is pivotable between a closed position and an open position, wherein the forward door pivots in one of a clockwise or a counter-clockwise direction, and wherein the aft door pivots in the other of the clockwise or the counter-clockwise direction, wherein when the forward and aft doors are in the closed position, the forward and aft doors are positioned in the side opening, wherein the pilot zone and the front row of seats are accessible and the back row and cargo zone are inaccessible from an exterior of the body when the aft door is in the closed position and the forward door is in the open position, and wherein the back row and cargo zone are accessible and the pilot zone and the front row of seats are inaccessible from the exterior of the body when the aft door is in the open position and the forward door is in the closed position,
 wherein the side opening includes a pilot zone access portion, a front row access portion, a back row access portion and a cargo zone access portion, wherein in the closed position, the forward door blocks access to the pilot zone access portion and the front row access portion, wherein in the closed position, the aft door blocks access to the back row access portion and the cargo hold access portion,
 wherein the divider member separates the passenger zone from the cargo zone such that a passenger in the passenger zone will not access the cargo zone when the aft door is in the closed position,
 wherein in the open position a protected area is defined between the forward and aft doors, and
 wherein the aircraft is a vertical take-off and landing aircraft.

16. The aircraft of claim 15 wherein the cargo zone includes a shelf that is pivotable between a stowed and a deployed position, wherein when the shelf is in the deployed position the cargo zone is divided into upper and lower storage sections.

17. The aircraft of claim 16 wherein the divider member includes a ledge, and wherein in the deployed position the shelf rests on the ledge.

\* \* \* \* \*